(12) United States Patent
Takeda et al.

(10) Patent No.: US 10,462,781 B2
(45) Date of Patent: Oct. 29, 2019

(54) USER TERMINAL, BASE STATION AND RADIO COMMUNICATION METHOD

(71) Applicant: NTT DOCOMO, INC., Tokyo (JP)

(72) Inventors: Kazuki Takeda, Tokyo (JP); Hiroki Harada, Tokyo (JP); Satoshi Nagata, Tokyo (JP); Hiroyuki Ishii, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 81 days.

(21) Appl. No.: 15/024,896

(22) PCT Filed: Sep. 22, 2014

(86) PCT No.: PCT/JP2014/074988
§ 371 (c)(1),
(2) Date: Mar. 25, 2016

(87) PCT Pub. No.: WO2015/046093
PCT Pub. Date: Apr. 2, 2015

(65) Prior Publication Data
US 2016/0242158 A1 Aug. 18, 2016

(30) Foreign Application Priority Data
Sep. 26, 2013 (JP) .................................. 2013-199480

(51) Int. Cl.
*H04W 72/04* (2009.01)
*H04L 1/18* (2006.01)
(Continued)

(52) U.S. Cl.
CPC ............ *H04W 72/044* (2013.01); *H04L 1/18* (2013.01); *H04L 1/1854* (2013.01); *H04L 5/001* (2013.01);
(Continued)

(58) Field of Classification Search
None
See application file for complete search history.

(56) References Cited

U.S. PATENT DOCUMENTS

2012/0207107 A1 8/2012 Li et al.
2012/0281548 A1* 11/2012 Lin ....................... H04W 76/18
370/242
(Continued)

FOREIGN PATENT DOCUMENTS

WO 2012/161510 A2 11/2012

OTHER PUBLICATIONS

Extended European Search Report issued in corresponding European Application No. 14849522.9, dated Apr. 12, 2017 (12 pages).
(Continued)

*Primary Examiner* — Candal Elpenord
(74) *Attorney, Agent, or Firm* — Osha Liang LLP

(57) ABSTRACT

The present invention is designed to carry out uplink transmission adequately even when CA is executed by applying different duplex modes between multiple cells. A user terminal communicates with an FDD cell and a TDD cell that employ carrier aggregation, and has a receiving section that receives DL signals transmitted from each cell, and a feedback control section that allocates and feeds back delivery acknowledgement signals in response to the DL signals in a predetermined UL subframe, and, regardless of which cell is configured as a primary cell, the feedback control section, when transmitting only a delivery acknowledgement signal in response to the DL signal of one cell, transmits the delivery acknowledgement signal from the one cell by using a PUCCH resource that is determined from a downlink control channel resource of the DL signal, and, when transmitting delivery acknowledgement signals in response to the DL signals of both cells, transmits the delivery acknowledgement signals by using a PUCCH resource of one or both of the cells.

6 Claims, 23 Drawing Sheets

(51) Int. Cl.
  *H04L 5/00* (2006.01)
  *H04L 5/14* (2006.01)
(52) U.S. Cl.
  CPC .............. *H04L 5/0055* (2013.01); *H04L 5/14* (2013.01); *H04L 5/1469* (2013.01); *H04W 72/042* (2013.01); *H04W 72/0413* (2013.01)

(56) References Cited

U.S. PATENT DOCUMENTS

| | | | |
|---|---|---|---|
| 2013/0195066 A1 | 8/2013 | Lee et al. | |
| 2013/0215824 A1* | 8/2013 | Wang ..................... | H04L 5/001 370/328 |
| 2013/0223300 A1* | 8/2013 | Yang ..................... | H04L 1/1861 370/280 |
| 2013/0322343 A1* | 12/2013 | Seo ....................... | H04W 24/02 370/328 |
| 2013/0324182 A1* | 12/2013 | Deng .................... | H04W 52/281 455/522 |
| 2014/0056278 A1* | 2/2014 | Marinier ............... | H04W 72/044 370/330 |
| 2014/0161060 A1* | 6/2014 | Nam ..................... | H04L 5/0055 370/329 |
| 2014/0192738 A1* | 7/2014 | Nam ..................... | H04L 5/001 370/329 |
| 2014/0321406 A1* | 10/2014 | Marinier ............... | H04B 7/024 370/329 |
| 2014/0334395 A1 | 11/2014 | Lee et al. | |
| 2015/0055454 A1* | 2/2015 | Yang ..................... | H04W 36/22 370/230 |
| 2015/0304087 A1* | 10/2015 | He ........................ | H04W 72/12 370/280 |

OTHER PUBLICATIONS

CATT; "Resource Allocation for PUCCH Format 3"; 3GPP TSG RAN WG1 Meeting #62bis, R1-105153; Xi'an, China; Oct. 11-15, 2010 (3 pages).
International Search Report issued in PCT/JP2014/074988 dated Jan. 6, 2015 (1 page).
Written Opinion of the International Searching Authority issued in PCT/JP2014/074988 dated Jan. 6, 2015 (3 pages).
3GPP TS 36.331 V10.1.0; 3rd Generation Partnership Project; Technical Specification Group Radio Access Network; Evolved Universal Terrestrial Radio Access (E-UTRA); and Evolved Universal Terrestrial Radio Access Network (E-UTRAN); Overall description; Stage 2; Release 11; Dec. 2012 (208 pages).
Office Action issued in the counterpart Japanese Patent Application No. 2013-199480, dated Jul. 26, 2016 (9 pages).
Office Action issued in corresponding Japanese Application No. 2016-227684, dated Feb. 6, 2018 (5 pages).
Samsung; "HARQ-ACK Resource Indication in PUCCH for DL CA"; 3GPP TSG RAN WG1 #62bis, R1-105359; Xian, China; Oct. 11-15, 2010 (4 pages).
Extended European Search Report issued in corresponding European Application No. 18170344.8, dated Aug. 9, 2018 (11 pages).
LG Electronics; "RAN1 issues for support of dual connectivity with small cell"; 3GPP TSG RAN WG1 #73, R1-132240; Fukuoka, Japan; May 20-24, 2013 (5 pages).
LG Electronics; "Discussions on dual connectivity over non-ideal backhaul"; 3GPP TSG RAN WG1 Meeting #74, R1-133379; Barcelona, Spain; Aug. 19-23, 2013 (3 pages).
BlackBerry UK Limited; "On Solutions for FDD-TDD joint operation"; 3GPP TSG RAN WG1 Meeting #74, R1-133780; Barcelona, Spain; Aug. 19-23, 2013 (7 pages).
NTT Docomo; "Views on Possible Solutions for TDD-FDD Joint Operation"; 3GPP TSG RAN WG1 Meeting #74, R1-133455; Barcelona, Spain; Aug. 19-23, 2013 (3 pages).
Office Action issued in corresponding Japanese Application No. 2013-199480, dated Apr. 26, 2016 (8 pages).
Etri; "Discussion on FDD-TDD joint operation solutions"; 3GPP TSG RAN WG1 Meeting #74, R1-133184; Barcelona, Spain; Aug. 19-23, 2013 (7 pages).
3GPP TS 36.300 V11.4.0; 3rd Generation Partnership Project; Technical Specification Group Radio Access Network; Evolved Universal Terrestrial Radio Access (E-UTRA); and Evolved Universal Terrestrial Radio Access Network (E-UTRAN); Overall description; Stage 2 (Release 11); Dec. 2012 (208 pages).

* cited by examiner

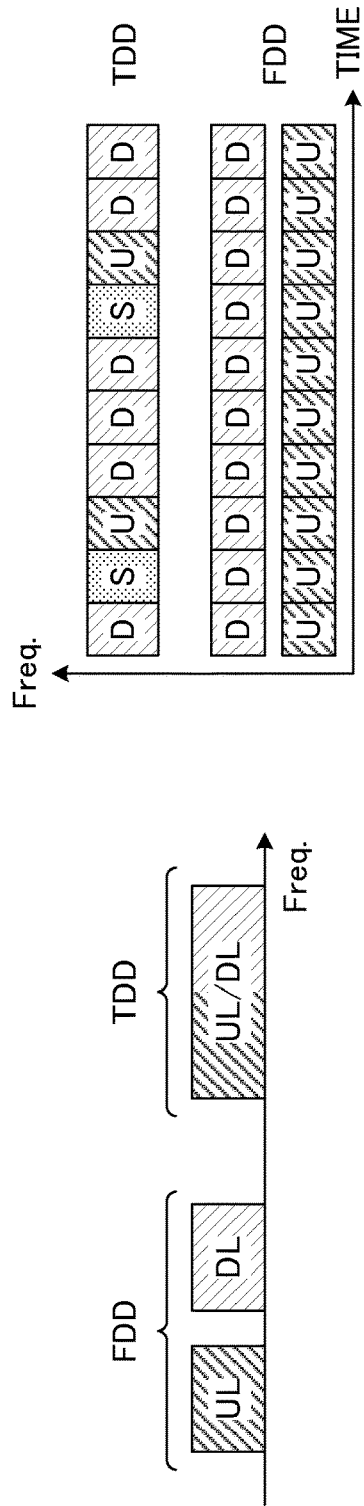
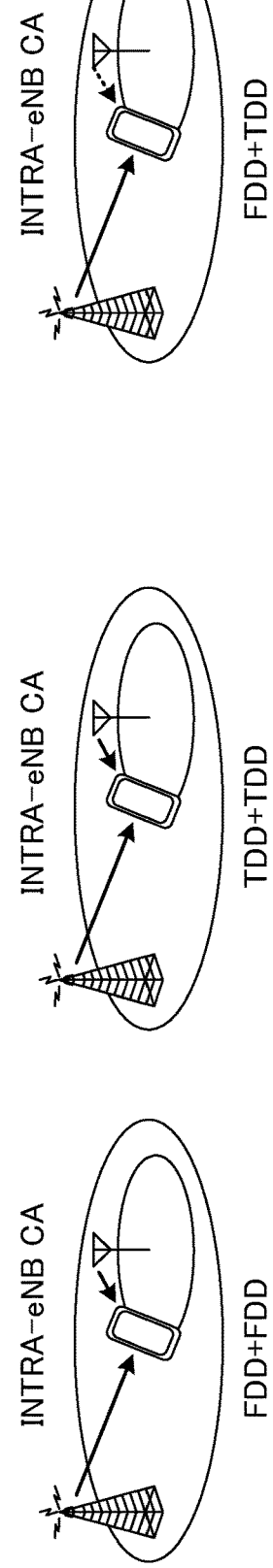
FIG.1A
FIG.1B
FIG.1C

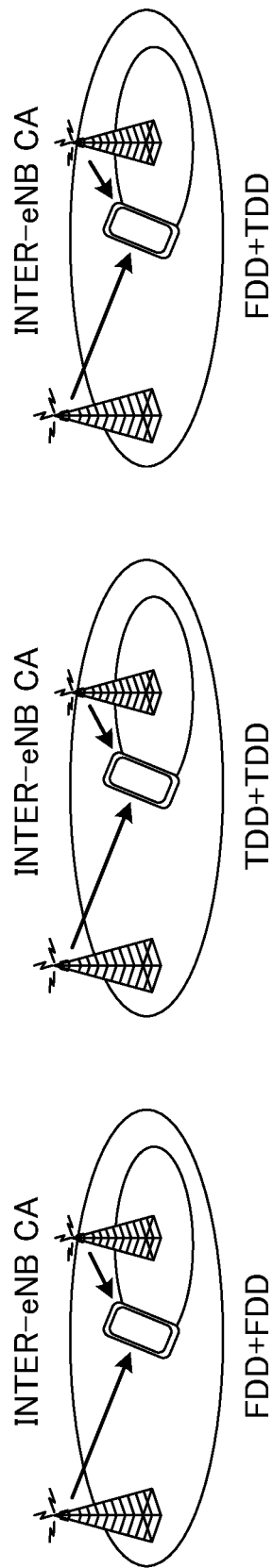
FIG.2A
FIG.2B
FIG.2C

| VALUE OF 'TPC COMMAND FOR PUCCH' | $n^{(1)}_{PUCCH,j}$, OR $(n^{(1)}_{PUCCH,j}, n^{(1)}_{PUCCH,j+1})$ |
|---|---|
| '00' | THE 1ST PUCCH RESOURCE VALUE CONFIGURED BY THE HIGHER LAYERS |
| '01' | THE 2ND PUCCH RESOURCE VALUE CONFIGURED BY THE HIGHER LAYERS |
| '10' | THE 3RD PUCCH RESOURCE VALUE CONFIGURED BY THE HIGHER LAYERS |
| '11' | THE 4TH PUCCH RESOURCE VALUE CONFIGURED BY THE HIGHER LAYERS |

$(n^{(1)}_{PUCCH,j}, n^{(1)}_{PUCCH,j+1})$ ARE DETERMINED FROM THE FIRST AND SECOND PUCCH RESOURCE LISTS CONFIGURED BY n1PUCCH-AN-CS-List-r10, RESPECTIVELY.

FIG.5B

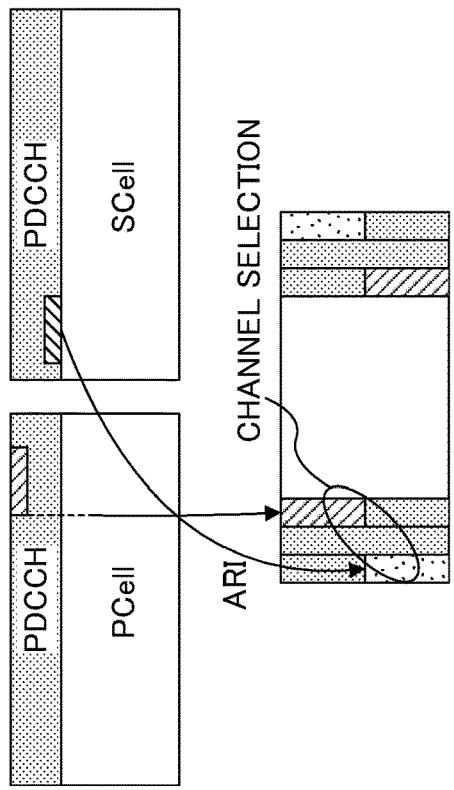

FIG.5A

| VALUE OF 'TPC COMMAND FOR PUCCH' OR 'HARQ-ACK RESOURCE OFFSET' | $n^{(3,\tilde{p})}_{PUCCH,j}$ |
|---|---|
| '00' | THE 1ST PUCCH RESOURCE VALUE CONFIGURED BY THE HIGHER LAYERS |
| '01' | THE 2ND PUCCH RESOURCE VALUE CONFIGURED BY THE HIGHER LAYERS |
| '10' | THE 3RD PUCCH RESOURCE VALUE CONFIGURED BY THE HIGHER LAYERS |
| '11' | THE 4TH PUCCH RESOURCE VALUE CONFIGURED BY THE HIGHER LAYERS |

USER TERMINAL, BASE STATION AND RADIO COMMUNICATION METHOD

TECHNICAL FIELD

The present invention relates to a user terminal, a base station and a radio communication method that are applicable to a next-generation communication system.

BACKGROUND ART

In a UMTS (Universal Mobile Telecommunications System) network, the specifications of long-term evolution (LTE) have been drafted for the purposes of further increasing high-speed data rates, providing lower delay and so on (non-patent literature 1). In LTE, as multiple-access schemes, a scheme that is based on OFDMA (Orthogonal Frequency Division Multiple Access) is used in downlink channels (downlink), and a scheme that is based on SC-FDMA (Single Carrier Frequency Division Multiple Access) is used in uplink channels (uplink). Also, successor systems of LTE (referred to as, for example, "LTE-advanced" or "LTE enhancement" (hereinafter referred to as "LTE-A")) are under study for the purpose of achieving further broadbandization and increased speed beyond LTE.

As duplex modes in LTE and LTE-A systems, there are frequency division duplex (FDD) to divide between the uplink (UL) and the downlink (DL) based on frequency, and time division duplex (TDD) to divide between the uplink and the downlink based on time (see FIG. 1A). In TDD, the same frequency region is applied to uplink and downlink communication, and signals are transmitted and received to and from one transmitting/receiving point by dividing the uplink and the downlink based on time.

Also, the system band of the LTE-A system (Rel. 10/11) includes at least one component carrier (CC), where the system band of the LTE system constitutes one unit. Gathering a plurality of components carriers (cells) to achieve a wide band is referred to as "carrier aggregation" (CA).

CITATION LIST

Non-Patent Literature

Non-Patent Literature 1: 3GPP TS 36.300 "Evolved UTRA and Evolved UTRAN Overall Description"

SUMMARY OF INVENTION

Technical Problem

In carrier aggregation (CA), which was introduced in Rel. 10/11, the duplex mode to employ between a plurality of CCs (also referred to as "cells," "transmitting/receiving points," etc.) is limited to the same duplex-mode (see FIG. 1B). On the other hand, future radio communication systems (for example, Rel. 12 and later versions) may anticipate CA to employ different duplex modes (TDD+FDD) between multiple CCs (see FIG. 1C).

Also, Rel. 10/11 anticipates intra-base station CA (intra-eNB CA), which controls CA by using one scheduler between multiple CCs. In this case, the PUCCH signals (delivery acknowledgement signals (ACKs/NACKs), etc.) that are transmitted in each CC in response to DL data signals (PDSCH signals) are multiplexed to be aggregated in a specific CC (primary cell (PCell)) and transmitted.

When conventional feedback mechanism is used in CA in which different duplex modes (TDD+FDD) are employed between multiple CCs, there is a risk that delivery acknowledgement signals and so on cannot be transmitted adequately on the uplink.

The present invention has been made in view of the above, and it is therefore an object of the present invention to provide a user terminal, a base station and a radio communication method, whereby uplink transmission can be carried out adequately even when CA is executed by applying different duplex modes between multiple cells.

Solution to Problem

The user terminal according to the present invention provides a user terminal that communicates with an FDD cell and a TDD cell employing carrier aggregation, and this user terminal has a receiving section that receives DL signals transmitted from each cell, and a feedback control section that allocates and feeds back delivery acknowledgement signals in response to the DL signals in a predetermined UL subframe, and, regardless of which cell is configured as a primary cell, the feedback control section, when transmitting only a delivery acknowledgement signal in response to the DL signal of one cell, transmits the delivery acknowledgement signal from the one cell by using a PUCCH resource that is determined from a downlink control channel resource of the DL signal, and, when transmitting delivery acknowledgement signals in response to the DL signals of both cells, transmits the delivery acknowledgement signals by using a PUCCH resource of one or both of the cells.

Advantageous Effects of Invention

According to the present invention, it is possible to carry out uplink transmission adequately even when CA is executed by applying different duplex modes between multiple cells.

BRIEF DESCRIPTION OF DRAWINGS

FIG. 1 provides diagrams to explain an overview of duplex modes in LTE and LTE-A, and intra-base station CA (intra-eNB CA);

FIG. 2 provides diagrams to explain intra-base station CA (intra-eNB CA) and inter-base station CA (inter-eNB CA);

FIG. 5 provides diagrams to explain PUCCH format 1b with channel selection;

DESCRIPTION OF EMBODIMENTS

As noted earlier, in LTE and LTE-A systems, two duplex modes—namely, FDD and TDD—have been provided (see above FIG. 1A). Also, from Rel. 10 onward, support for intra-base station CA (intra-eNB CA) has been provided. However, CA in Rel. 10/11 is limited to the same duplex mode (FDD+FDD intra-eNB CA or TDD+TDD intra-eNB CA) (see above FIG. 1B).

Meanwhile, the systems of Rel. 12 and later versions presume intra-base station CA (intra-eNB CA), which employs different duplex modes (TDD+FDD) between multiple CCs (see above FIG. 1C). Furthermore, the systems of Rel. 12 and later versions also presume employing inter-base station CA (inter-eNB CA) (see FIG. 2A). Note that inter-base station CA is supported regardless of the duplex-mode, and it may be possible to introduce inter-base station CA which accommodates different duplex modes (TDD+FDD).

In intra-base station CA (intra-eNB CA), scheduling is controlled using one scheduler between multiple cells (see FIG. 2B). That is, a user terminal has only to feed back uplink control signals (UCI) such as a delivery acknowledgement signal (ACK/NACK (hereinafter also referred to as "A/N")) and/or the like to a specific cell (PCell) alone.

Meanwhile, in inter-base station CA (inter-eNB CA), schedulers are provided separately for each of multiple cells, and scheduling is controlled on a per cell basis. Also, inter-eNB CA presumes that each base station is connected in such a manner that the delay is not negligible (non-ideal backhaul connection). Consequently, a user terminal has to feed back uplink control signals (UCI) to each cell (see FIG. 2C).

When CA is executed by applying different duplex modes between multiple CCs (cells) (TDD-FDD CA), the problem is how user terminals should send A/N feedback. For example, it may be possible that each cell employs conventional feedback mechanism on an as-is basis in TDD-FDD CA.

Figure 3A:
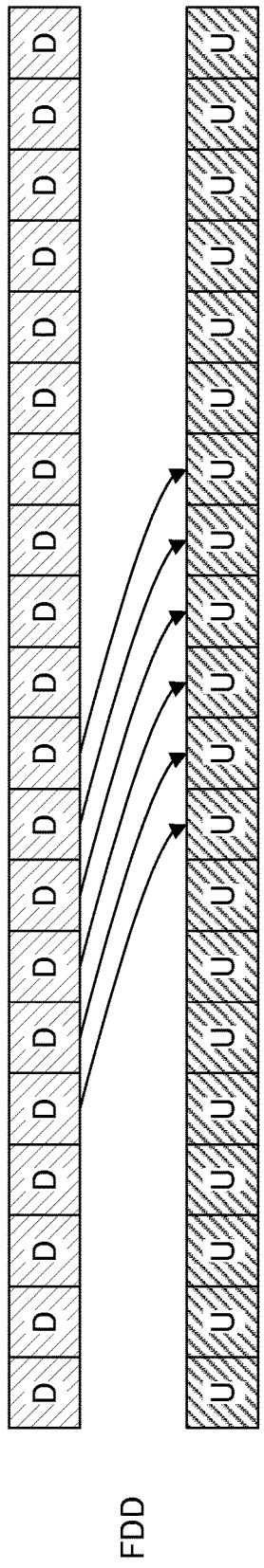
FIG. 3 provides diagrams to explain the DL HARQ timings (uplink A/N feedback timings) in FDD and TDD.

FIG. 3A shows a case where, in a cell employing FDD (hereinafter also referred to as an "FDD cell"), a user terminal feeds back A/N's in response to PDSCH signals with conventional timing. In this case, the user terminal feeds back the A/N's in UL subframes that come a predetermined number of subframes after (for example, 4 ms after) the DL subframes in which the PDSCH signals are allocated.

Figure 3B:
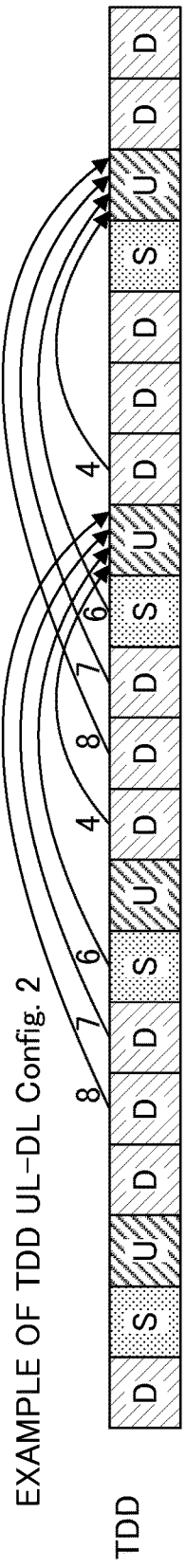

FIG. 3B shows a case where, in a cell employing TDD (hereinafter also referred to as a "TDD cell"), a user terminal feeds back A/N's in response to PDSCH signals with conventional timing. In this case, the user terminal feeds back the A/N's in UL subframes that are assigned in advance to the DL subframes in which the PDSCH signals are allocated.

In TDD up to the Rel. 11 system, the configuration ratio of UL and DL has had a plurality of patterns (DL/UL configurations 0 to 6), and, in each DL/UL configuration, the DL subframes to be allocated to UL subframes are determined. For example, FIG. 3B shows the case of DL/UL configuration 2 (DL/UL Config. 2), in which each DL subframe is allocated to (associated with) a predetermined UL subframe. In FIG. 3B, the number that is assigned to each DL subframe (including special subframes) shows the number of subframe from the corresponding UL subframe.

In conventional systems, the timing to feed back A/N's (DL HARQ timing) stays the same even when CA is employed. However, even when CA is applied to UL, A/N transmission using the PUCCH is determined to be carried out only in a specific cell (PCell).

Also, in conventional systems, a plurality of formats (PUCCH formats) are defined for the PUCCH transmission of uplink control signals such as delivery acknowledgement signals (A/N signals) and channel quality information (CQI). Now, PUCCH formats defined for A/N feedback will be described below.

Figure 4:
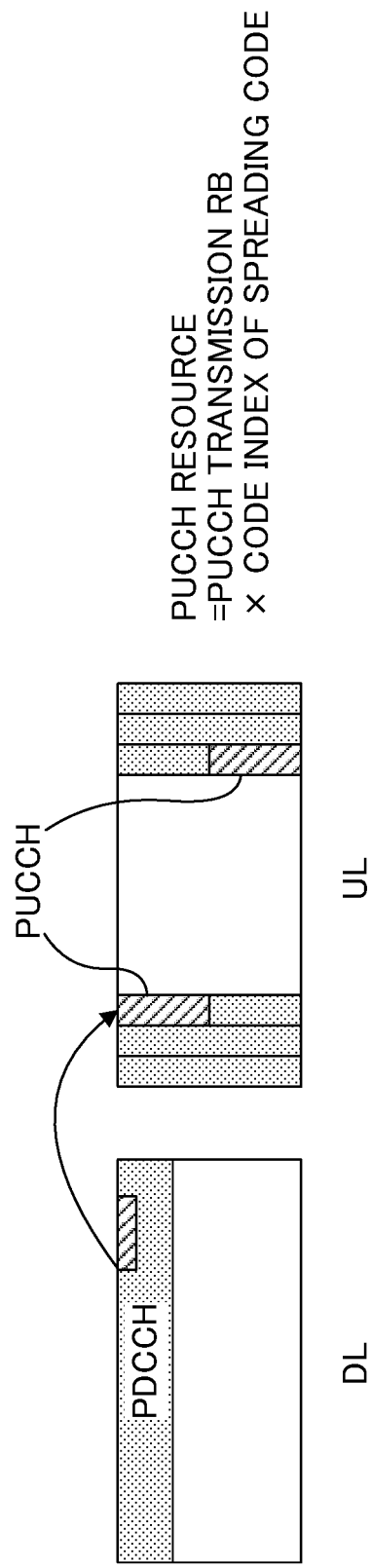
FIG. 4 is a diagram to explain PUCCH format 1b.

When CA is not employed in an FDD cell (non-CA), the A/N's that are fed back from each user terminal in one subframe are one to two bits. In this case, the user terminals apply PUCCH format 1a/1b and feed back one or two A/N bits by using BPSK or QPSK (BPSK or QPSK modulation). In PUCCH format 1a/1b, the PUCCH resource to allocate an A/N is determined based on the place where downlink control information (DL DCI) is scheduled (PDCCH/EPDCCH resource index (CCE/ECCE index)) and a parameter that is reported through RRC signaling (RRC parameter) (see FIG. 4). In this case, it is possible to encode and multiplex maximum thirty six A/N's per RB.

When CA (two CCs) is employed in an FDD cell, the A/N's that are fed back from each user terminal in one subframe require maximum four bits. In this case, the user terminals apply PUCCH format 1b with channel selection and transmit maximum four A/N bits. In PUCCH format 1b with channel selection (hereinafter also referred to simply as "channel selection"), a PUCCH resource candidate is determined from the place where DL DCI for the PCell is scheduled (CCE/ECCE index), and an RRC parameter. Also, another PUCCH resource candidate is determined from the TPC command field (also referred to as an "ARI") that is included in DL DCI for an SCell, and an RRC parameter (see FIG. 5A).

The ARI is an ACK/NACK resource indicator (A/N resource indicator) that was introduced in Rel. 10, and is used to specify the PCell's PUCCH resource that is used to send A/N feedback for the PDSCH transmitted from the SCell when CA is employed. To be more specific, a plurality of PUCCH resource candidates are reported in advance to a user terminal through higher layers such as RRC, and one among these is specified by the ARI.

In channel selection, maximum A/N four bits are represented using a plurality of PUCCH resource candidates and QPSK symbols. The user terminals select and feed back predetermined PUCCH resources/QPSK symbol points depending on the content of each cell's A/N.

For example, assume a case where, in PUCCH format 1b with channel selection, four PUCCH resource candidates are configured. In this case, the PUCCH resource for when channel selection is not executed (PUCCH format 1b) and the PUCCH resource following that PUCCH resource will be referred to as PUCCH resource candidates 1 and 2, respectively. The PUCCH resource candidate 2 can be calculated by adding +1 to the CCE/ECCE that is used to calculate the PUCCH resource candidate 1. Also, from a set of four resource candidates that are configured in advance by RRC signaling, PUCCH resources that are specified dynamically by TPC commands (ARIs) contained in the SCell's DCI are PUCCH resource candidates 3 and 4 (see FIG. 5B).

Also, when CA with three or more CCs is employed in an FDD cell, the A/N's that are fed back from each user terminal in one subframe require maximum ten bits. In this case, the user terminals apply PUCCH format 3 and transmit maximum ten A/N bits. In PUCCH format 3, a PUCCH resource candidate is determined from a TPC command (ARI) that is contained in DL DCI of the SCell, and an RRC parameter (see FIG. 6A).

Figures 6A, 6B:
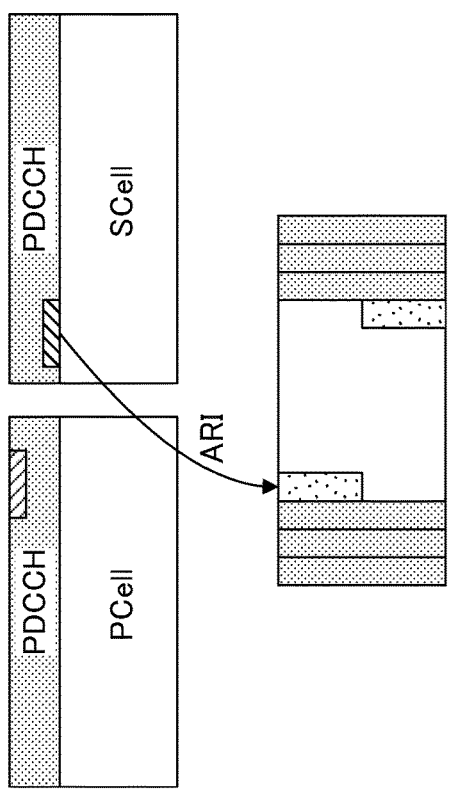
FIG. 6 provides diagrams to explain PUCCH format 3.

To be more specific, from four PUCCH resource candidates that are specified in advance by RRC signaling, the user terminals employ PUCCH resources that are specified dynamically by TPC commands (ARIs) contained in the SCell's DCI (see FIG. 6B). Note that, even when PUCCH format 3 is configured, if the user terminals detect no SCell DL DCI, the user terminals use PUCCH format 1b (that is, fall back to PUCCH format 1b). In this case, PUCCH resources are determined by the above method shown in FIG. 4.

On the other hand, since A/N's for a plurality of DLs are allocated to one UL in a TDD cell, even when CA is not employed (non-CA), A/N feedback of more than two bits is required. Consequently, in TDD, it is possible to execute A/N bundling, in which A/N's for a plurality of DL subframes are grouped and processed as one A/N. In this case, feedback can be sent by using PUCCH format 1a/1b. Meanwhile, in TDD, even when CA is not employed, it is possible to configure the above-noted PUCCH format 1b with channel selection and PUCCH format 3. When CA is employed, the above PUCCH format 1b with channel selection and PUCCH format 3 are employed.

In this way, in conventional systems, different PUCCH mechanisms are simply defined between FDD and TDD on a separate basis, and therefore the method of PUCCH transmission poses the problem when CA is executed by applying different duplex modes between multiple cells (multiple CCs) (TDD-FDD CA).

Also, the present inventors have found out that, in TDD-FDD CA, sending A/N feedback and so on by using the PCell's PUCCH alone has the risk of limiting the UL subframes to use for feedback. For example, when the PCell serves as the TDD cell and the SCell serves as the FDD cell, there is a risk that adequate UL transmission of delivery acknowledgement signals and so on is not possible.

Figure 7A:
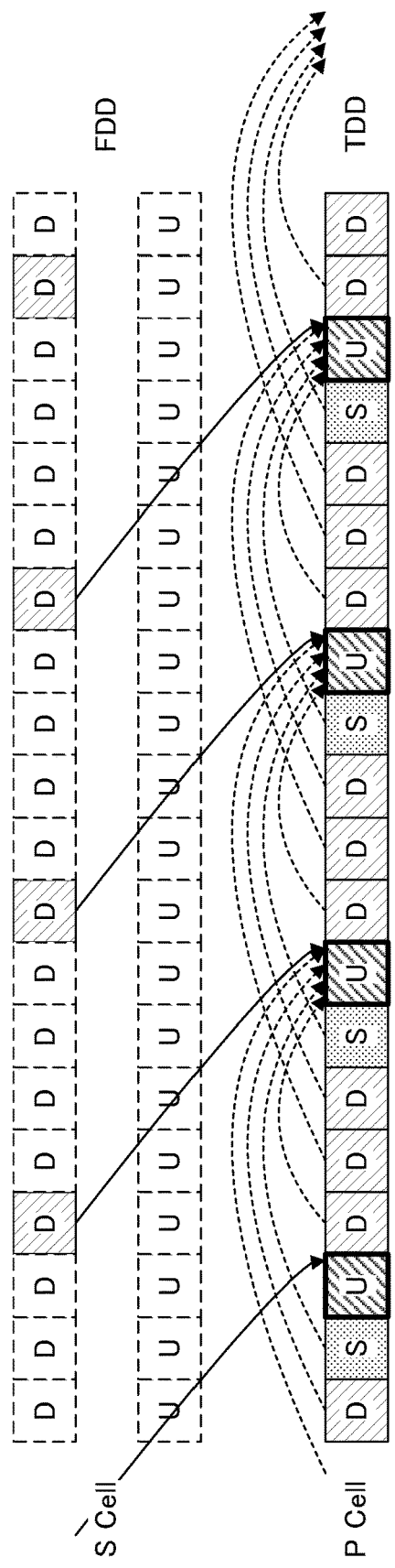
FIG. 7 provides diagrams to explain the feedback timing when existing A/N feedback timing is employed in TDD-FDD CA.

FIG. 7A shows a feedback method in which, when the PCell serves as the TDD cell and the SCell serves as the FDD cell, the DL HARQ timing of the SCell (FDD cell) is coordinated with the above FDD cell's timing (FIG. 3A). In this case, UL subframes for A/N feedback cannot be allocated to many of the DL subframes of the SCell (FDD cell). That is, A/N's in response to the PDSCH signal that is transmitted in each DL subframe cannot be fed back. Furthermore, despite the fact that there are vacant UL subframe resources in the SCell (FDD cell), these cannot be used for the PUCCH.

Figure 7B:
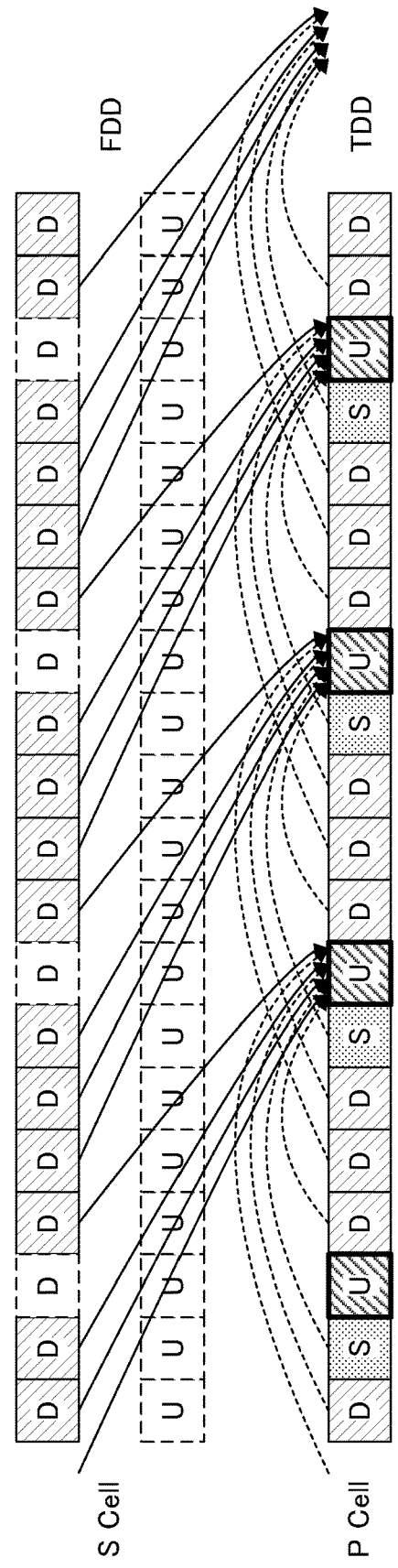

FIG. 7B shows a feedback method in which, when the PCell serves as the TDD cell and the SCell serves as the FDD cell, the DL HARQ timing of the SCell (FDD cell) is coordinated with the above TDD cell's timing (FIG. 3B). In this case, compared to FIG. 7A, the number of SCell DL subframes where UL subframes for A/N feedback, which are the PCell's (TDD cell's) subframes, can be allocated increases. However, since the FDD cell's feedback timing (for example, 4 ms) is changed, there is a risk that complex control is required, compared to heretofore. Also, even when there are vacant UL subframe resources in the SCell (FDD cell), these cannot be used for the PUCCH.

So, the present inventors have found out that, when TDD-FDD CA is employed (in particular, when the PCell serves as the TDD cell and the SCell serves as the FDD cell), it is possible to allocate UL subframes to each DL subframe of the PCell and the SCell adequately by supporting UL transmission (PUCCH transmission) using the PUCCH in the SCell's UL.

Figure 8:
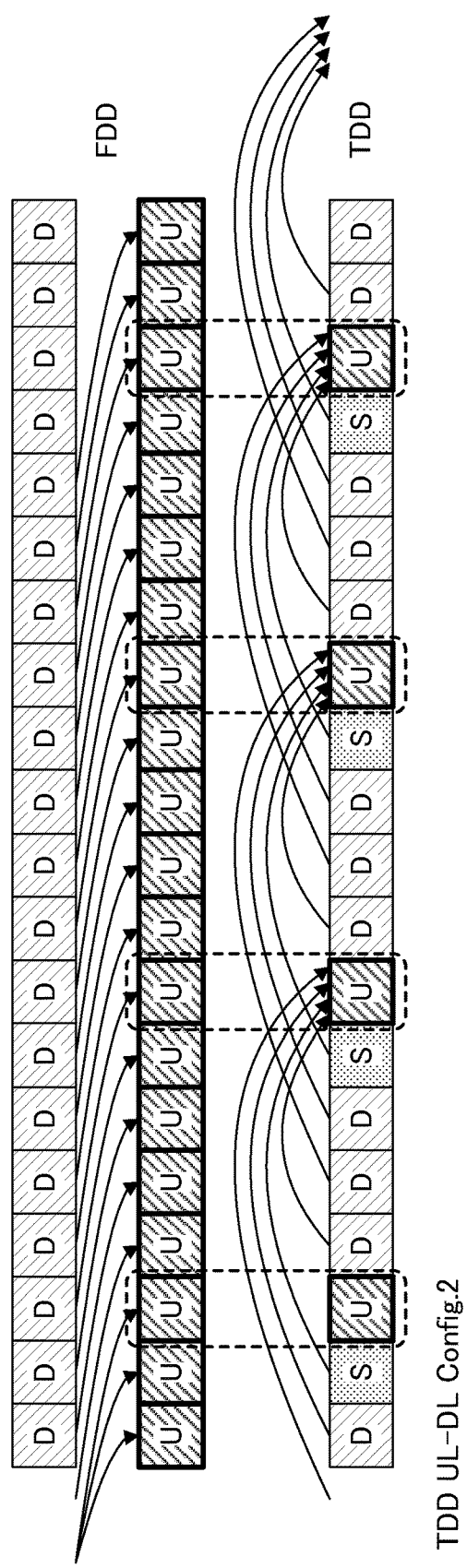
FIG. 8 is a diagram to show an example of the A/N feedback method according to the present embodiment in TDD-FDD CA.

To be more specific, in intra-eNB CA, regardless of which of the FDD cell and the TDD cell is the PCell, if UL subframes are configured in the FDD cell alone, delivery acknowledgement signals and so on are fed back (PUCCH transmission) by using these UL subframes of the FDD cell. Also, when UL subframes are configured in both the FDD cell and the TDD cell (when the TDD cell's UL subframes are configured), the present inventors have come up with the idea of feeding back delivery acknowledgement signals by using the UL subframes of one or both of the TDD cell and the FDD cell (see FIG. 8).

That is, in intra-eNB CA, in subframes other than the subframes where UL is configured in both the FDD cell and the TDD cell, A/N-related PUCCH transmission is carried out by using the FDD cell's UL subframes. To be more specific, among the DL subframes of the FDD cell, A/N's in response to DL subframes apart from the DL subframes that are four subframes before UL subframes in the TDD cell are fed back using the FDD cell's UL subframes. By this means, regardless of which of the FDD cell and the TDD cell is the PCell, FDD UL subframe resource are utilized effectively. Also, in subframes in which UL is configured in both the FDD cell and the TDD cell, A/N feedback is controlled by using subframes of one or both of the TDD cell and the FDD cell.

Furthermore, taking into account the introduction of two of intra-eNB CA and inter-eNB CA, the present inventors have conceived that it is preferable to apply the A/N feedback mechanism in the following manner.

(1) Regardless of which of intra-eNB CA and inter-eNB CA is used, if a DL assignment (A/N transmission) is present only in one CC, HARQ is sent in this CC (confined to this CC). By this means, it is possible to reduce the load of implementation without increasing the feedback mechanism which the NW (for example, base stations) and the user terminals should support.

(2) In intra-eNB CA, when a DL assignment is present in both CCs, ACKs/NACKs are fed back from one or both CCs. Note that which feedback method a user terminal should employ depends on the user terminal's capability (UE capability), the combination of the frequency bands employed in each CC (band combination), and so on.

(3) In inter-eNB CA, when a DL assignment is present in both CCs, feedback is sent from each of the two CCs (confined to each CC)

(4) The HARQ timing is made common between intra-eNB CA and inter-eNB CA. For example, in either case, the existing HARQ timing which does not employ CA may be used.

Now, specific A/N feedback according to the present embodiment will be described below in detail with reference to the accompanying drawings. Note that, although cases will be described as examples in which TDD configuration 2 is used in the TDD cell in the following description, the TDD configuration that is applicable to the present embodiment is by no means limited to this.

Embodiment 1

With embodiment 1, an A/N feedback method (method of determining the cell and PUCCH resource to carry out PUCCH transmission) which a user terminal employs in TDD-FDD CA will be described.

<Intra-eNB CA>

In intra-eNB CA, when A/N feedback for only one cell is sent, PUCCH transmission is carried out in this one cell, as when CA is not employed (non-CA). For example, in subframes in which only the A/N feedback for the PCell is sent, the PCell's PUCCH is employed. In this case, as in conventional systems where CA is not employed (non-CA), a user terminal determines the PUCCH resource from the PDCCH/EPDCCH resource index transmitted in the PCell (CCE index/ECCE index). The PUCCH format which the user terminal employs can be made the PUCCH format that is used when CA is not employed.

Also, in subframes in which only the ACK/NACK feedback for the SCell is sent, the SCell's PUCCH is employed. In this case, as in conventional systems where CA is not employed (non-CA), the user terminal determines the PUCCH resource from the PDCCH/EPDCCH resource index (CCE index/ECCE index) transmitted in the SCell. The PUCCH format which the user terminal employs can be made the PUCCH format that is used when CA is not employed.

Figure 9A:
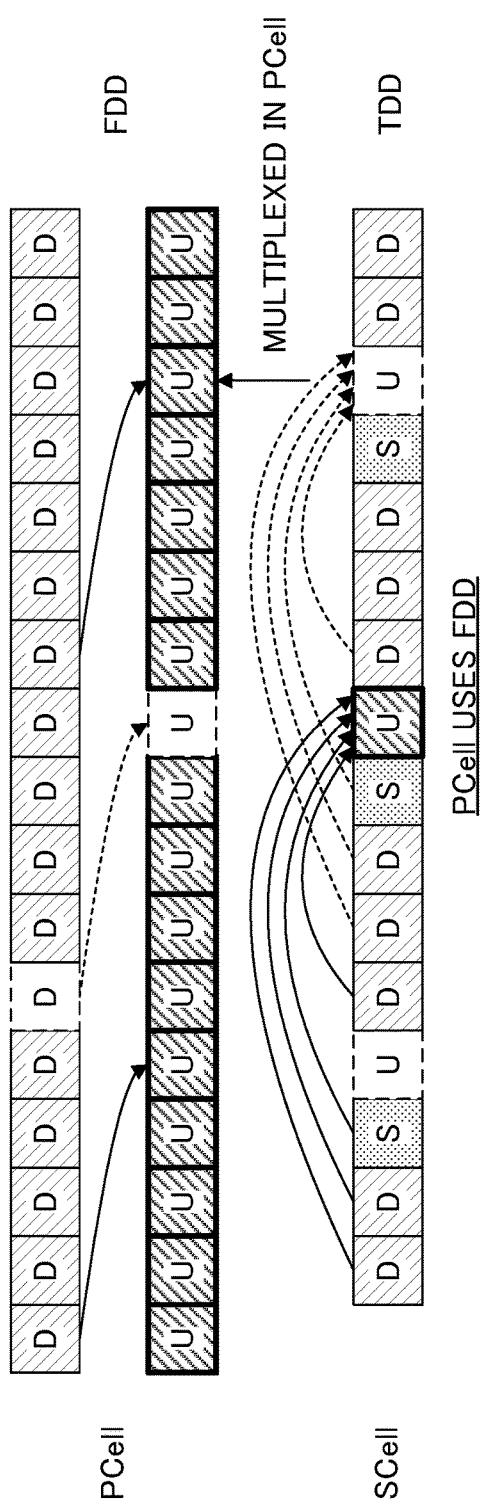
FIG. 9 provides diagrams to show another example of the A/N feedback method according to the present embodiment in TDD-FDD CA.
Figure 9B:
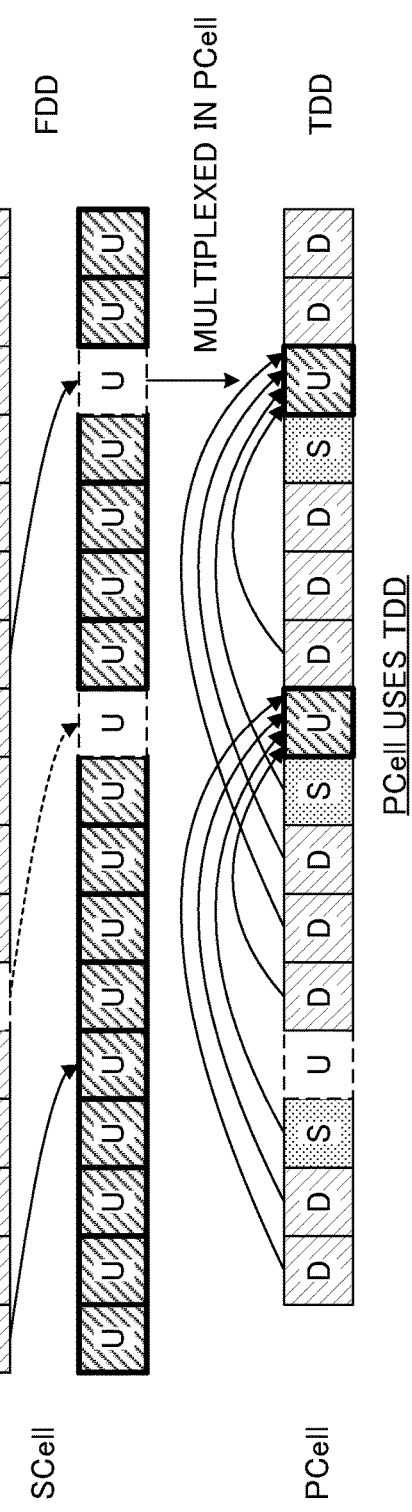
Figure 12A:
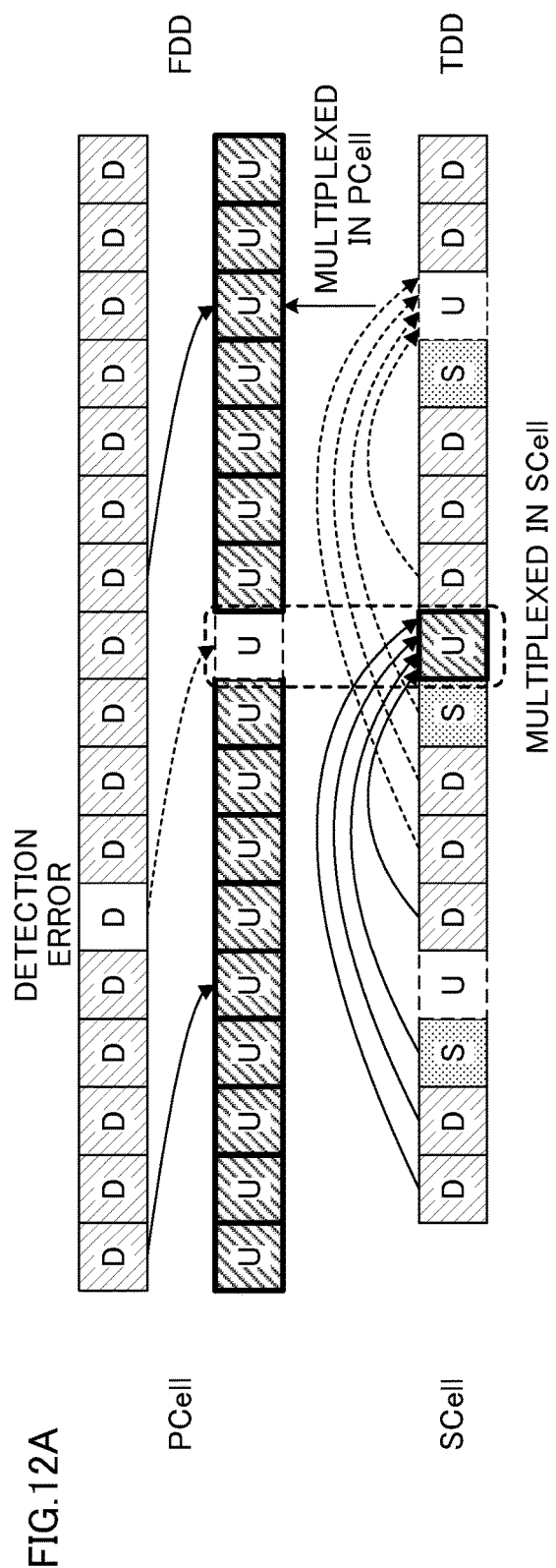
FIG. 12 provides diagrams to show an example of the A/N feedback method according to the present embodiment in TDD-FDD CA.
Figure 12B:
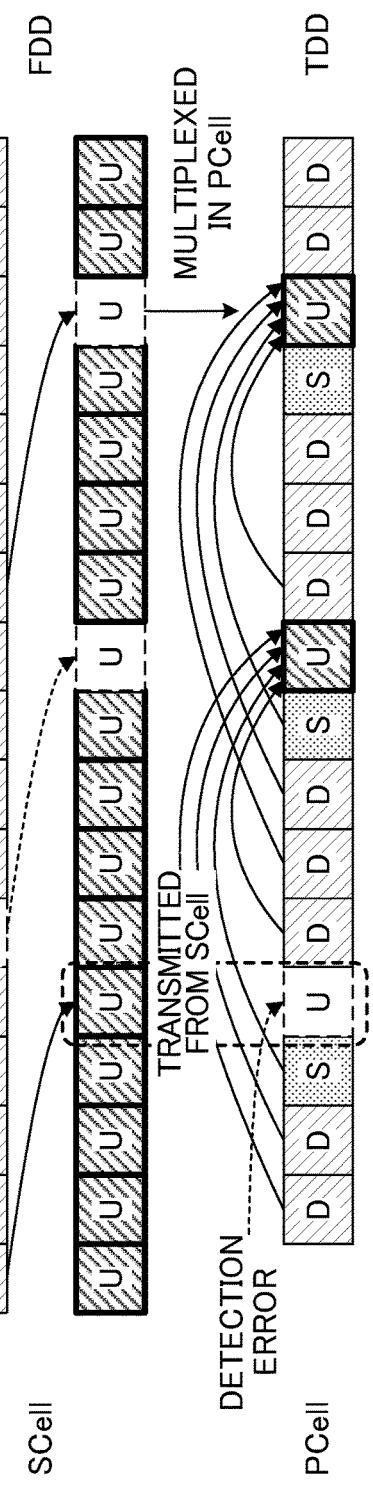
Figure 17:
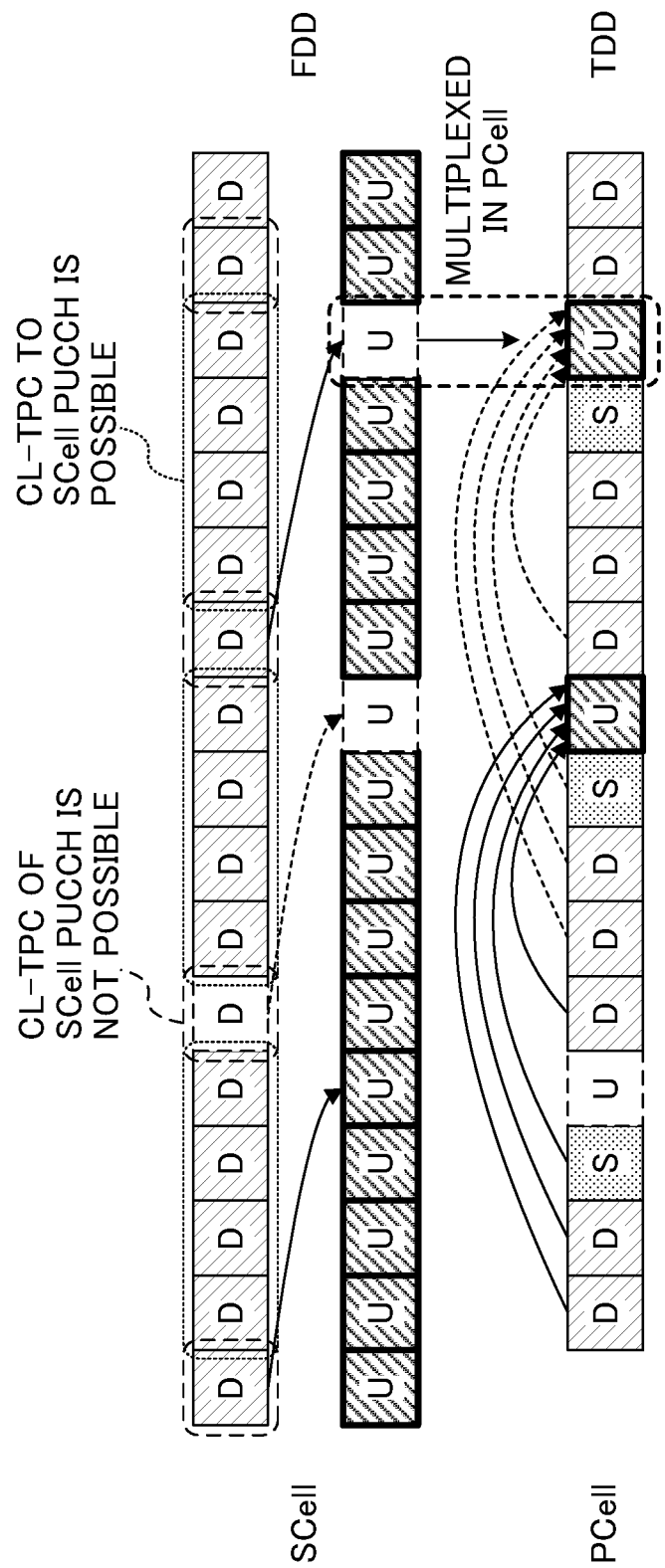
FIG. 17 is a diagram to explain whether or not CL-TPC is employed in the A/N feedback according to the present embodiment in TDD-FDD CA.

In subframes in which A/N transmission is carried out from both the FDD cell and the TDD cell, the A/N's are collected in the PUCCH of one cell (for example, the PCell) and fed back (see FIGS. 9A and 9B). FIG. 9A shows a case where the PCell serves as the FDD cell, and FIG. 9B shows a case where the PCell serves as the TDD cell, and, when there are A/N's to feed back from both cells, these A/N's are multiplexed in the PCell and transmitted. Note that, although FIG. 9 only shows, in the FDD cell, allocating DL subframes to subframes where UL is configured in both of the FDD cell and the TDD cell, as shown in above FIG. 8, the other DL subframes are also allocated UL subframes that correspond to these DL subframes. The same holds with following FIGS. 10, 12 and 17.

In this way, when each cell's A/N is multiplexed in one of the FDD cell and the TDD cell, the user terminal applies PUCCH format 1b with channel selection or PUCCH format 3 (reuse of existing CA). Also, PUCCH resource candidates in channel selection and the PUCCH resource to use in PUCCH format 3 can be determined by using DL DCI information (TPC command field) of the SCell as an ARI.

Note that, according to the present embodiment, when A/N transmission is carried out from both of the FDD cell and the TDD cell, it is equally possible to collect and transmit the A/N's in the PUCCH of the SCell, not the PCell. Consequently, the base stations configure PUCCH resource candidates for the PCell and/or PUCCH resource candidates for the SCell, in the user terminal, by using RRC signaling, as appropriate. Also, when the base stations configure PUCCH resource candidates for the PCell and PUCCH resource candidates for the SCell through RRC signaling, it is possible to indicate the CC to carry out PUCCH transmission, to the user terminal, by using the ARI. By this means, dynamic PUCCH off-loading becomes possible.

<Inter-eNB CA>

In inter-eNB CA, whether there is A/N transmission from one or both of the FDD cell and the TDD cell, A/N feedback is sent using each cell's UL subframes. For example, in subframes in which only the A/N feedback for the PCell is sent, the PCell's PUCCH is employed. In this case, as in conventional systems where CA is not employed (non-CA), a user terminal determines the PUCCH resource from the PDCCH/EPDCCH resource index (CCE index/ECCE index) that is transmitted in the PCell.

Also, in subframes in which only the ACK/NACK feedback for the SCell is sent, the SCell's PUCCH is employed. In this case, as in conventional systems where CA is not employed (non-CA), the user terminal determines the PUCCH resource from the PDCCH/EPDCCH resource index (CCE index/ECCE index) that is transmitted in the SCell.

Figure 10:
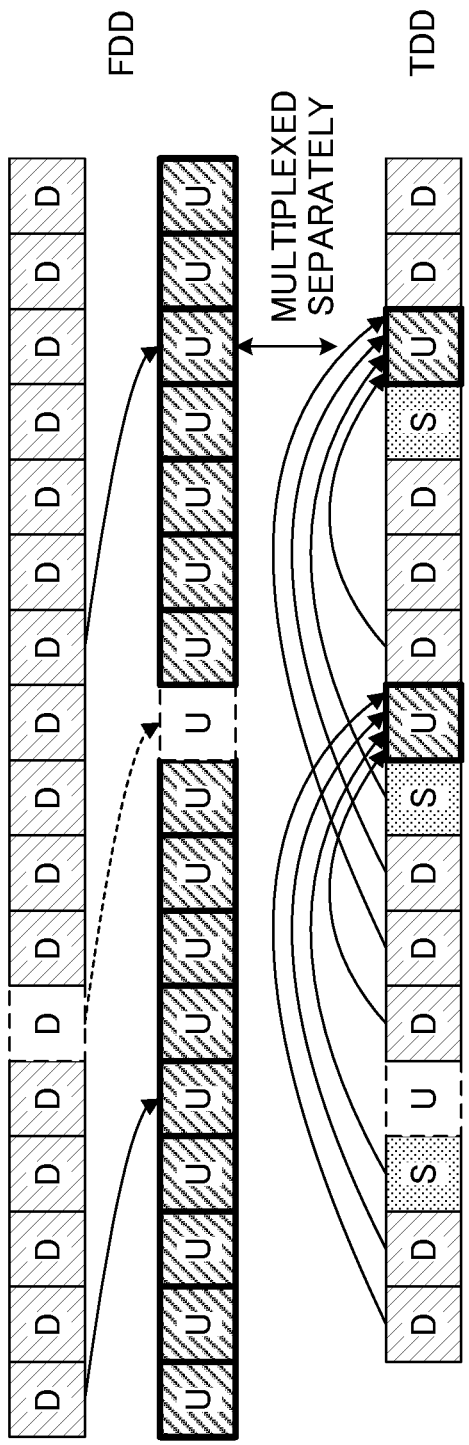
FIG. 10 is a diagram to show another example of the A/N feedback method according to the present embodiment in TDD-FDD CA.

In subframes in which A/N transmission is carried out from both the FDD cell and the TDD cell, each cell's A/N's are transmitted separately using respective PUCCHs (see FIG. 10). In this case, as in existing cases where CA is not employed (non-CA), the user terminal determines the PUCCH resource to use in each cell, from the PDCCH/EPDCCH resource index transmitted in each cell.

In this way, even when A/N transmission is carried out from both the FDD cell and the TDD cell, by transmitting each cell's A/N's independently using respective PUCCHs, it becomes possible to send DL HARQ adequately even when the base station of each cell is connected via a non-ideal backhaul.

Embodiment 2

In intra-eNB CA according to above embodiment 1, when A/N transmission is carried out from both the FDD cell and the TDD cell in subframes in which UL is configured in both the TDD cell and the FDD cell, a user terminal collects the A/N's in one CC and performs PUCCH transmission. However, the present inventors have found out that this case has a risk of raising the problem that the user terminal is unable to receive the PCell's DL DCI properly.

When the user terminal collects and transmits the A/N's of the separate CCs in one CC, the PUCCH resources to use in channel selection and PUCCH format 3 are selected by using the TPC command field of the SCell as an ARI. Meanwhile, when there is allocation in the SCell alone (when there is only an A/N of the SCell), the TPC command field of the SCell is used in the transmission power control for the PUCCH. That is, depending on whether there is allocation in the SCell alone or whether there is allocation in both the PCell and the SCell, the function of the SCell's TPC command (power control or the ARI) in relationship to the user terminal changes.

Figure 11:
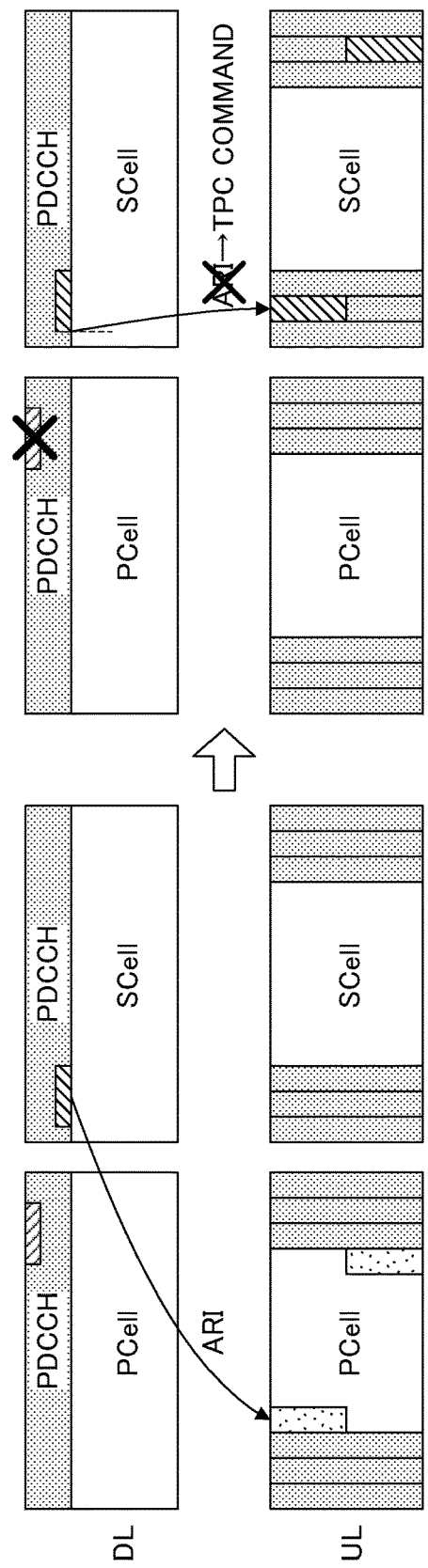
FIG. 11 is a diagram to show an example of a PUCCH resource determining method.

When the user terminal detects allocation in the PCell and the SCell properly, the user terminal determines the PUCCH resource by using the ARI. However, when the user terminal fails to detect the PCell's DCI (detection error), the user terminal judges that there is allocation only in the SCell and sends A/N feedback only with respect to the SCell. In this case, the user terminal employs the SCell's TPC command as a TPC command, not as an ARI, which is its original function (see FIG. 11). By this means, the bit information to function as an ARI changes the transmission power of the PUCCH in the SCell.

For example, when the PCell serves as the FDD cell, assume a case where DL assignments (A/N transmission) from both the TDD cell and FDD cell are present in a subframe which is directed to UL in both the TDD cell and FDD cell. When the user terminal fails to detect DL DCI (PDCCH signal) in the FDD DL subframe that is four subframes back from that subframe, the user terminal judges that there is a DL assignment the TDD cell alone and carries out PUCCH transmission in the Scell (see FIG. 12A).

In this case, the network (NW) specifies the PUCCH resource by using the TPC command in the DCI of the TDD cell (SCell) as an ARI. Meanwhile, the user terminal determines the PUCCH resource from the SCell's PDCCH/EPDCCH resource. Consequently, the ARI indicated in the TDD DCI is seen as a TPC command in the user terminal. Note that, when the DCI of the TDD cell, which is the SCell, results in a detection failure, no specific problem arises.

Similarly, when the PCell uses TDD, assume a case where DL assignments (A/N transmission) from both the TDD cell and the FDD cell are present in a subframe which is directed to UL in both the TDD cell and the FDD cell. When the user terminal fails to detect the TDD cell's DL DCI (PDCCH signal), the user terminal judges that there is a DL assignment the FDD cell alone and carries out PUCCH transmission in the Scell (see FIG. 12B)

In this case, the network (NW) specifies the PUCCH resource by using the TPC command in the DCI of the FDD cell (SCell) as an ARI. Meanwhile, the user terminal determines the PUCCH resource from the SCell's PDCCH/EPDCCH resource. Consequently, the ARI indicated in the FDD DCI is seen as a TPC command in the user terminal. Note that, when the DCI of the FDD cell, which is the SCell, results in a detection failure, no specific problem arises.

Regarding the above problem, the same problem arises when PUCCH transmission in the SCell is introduced in FDD-FDD CA and in TDD-TDD CA. So, the present inventors have come up with the idea of not using the TPC command contained in the SCell's DL DCI as an ARI (example 1). In this case, if A/N feedback is sent in response to DL assignments of both the PCell and the SCell, the PUCCH resource is determined by a method that is different from conventional methods. Also, the present inventors have come up with the idea of, while using the TPC command contained in the SCell's DL DCI as an ARI, limiting the application of the TPC command when only the SCell's DL DCI is detected (example 2).

For example, in example 1, the user terminal determines the PUCCH resource by using the PDCCH/EPDCCH resource where the DL DCI of the SCell and/or the PCell is contained, the signal configuration (Config) and so on, instead of the ARI. Also, in example 2, the user terminal limits the use of the SCell's TPC command. By employing example 1 and example 2, even when the user terminal fails to detect the DL DCI of the PCell, it is still possible to prevent the function of the TPC command from being interpreted inconsistently (whether it is used as a TPC command or as an ARI) between the NW (base stations) and the user terminal, and permit a consistent interpretation. Now, example 1 and example 2 will be described in detail below.

Example 1

With example 1, the TPC command that is contained in the DL DCI of the SCell is not used as an ARI, and the PUCCH resource is determined by using PDCCH/EPDCCH resources, signal configurations (Config) and so on. Now, methods 1 to 3 of example 1 will be described below.

<Method 1>

In method 1, the TPC command that is contained in the DL DCI of the SCell is not used as an ARI, and the PDCCH/EPDCCH resource where the DL DCI of the SCell is contained is used as a virtual ARI.

Figure 13:
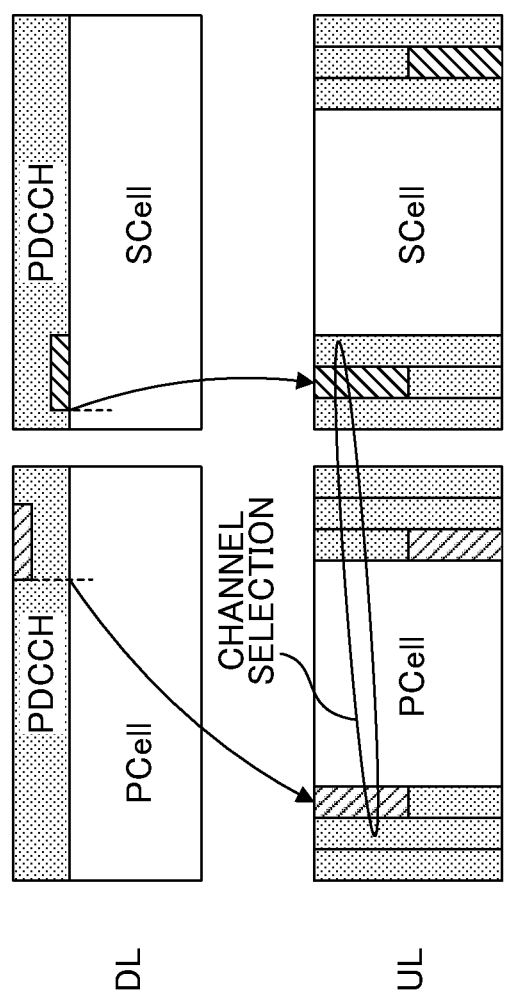
FIG. 13 is a diagram to show an example of a PUCCH resource determining method.

When PUCCH format 1b with channel selection is employed, a plurality of PUCCH resource candidates are determined based on the PDCCH/EPDCCH resources (CCEs/ECCEs) of the PCell and the SCell, without using an ARI. To be more specific, the PUCCH resource to use when sending A/N feedback for the PCell alone, and the PUCCH resource to use used when sending A/N feedback for the SCell alone are made PUCCH resource candidates (see FIG. 13).

Also, other PUCCH resource candidates can be determined based on one or both of the above two PUCCH resources. For example, the PUCCH resource that is acquired by adding a predetermined number (for example, +1, −1, etc.) to one or both of the above two PUCCH resources may be used.

By this means, even when the user terminal fails to detect the DL DCI of the PCell, it is still possible to prevent the NW (base stations) and the user terminal from interpreting the TPC command (or the ARI) differently.

Also, according to the above method, when A/N transmission is carried out in both the PCell and the SCell and the user terminal fails to detect one of them, the PUCCH resource is selected from among the PUCCH resource candidates in channel selection. In other words, the base stations, by only identifying the PUCCH resource to allocate in the event of the PCell alone and in the event of the SCell alone, can receive A/N's in all cases, regardless of whether or not there is a DL DCI detection failure by the user terminal. Consequently, it is possible to reduce the load of PUCCH resource detection by the base stations.

Figure 14:
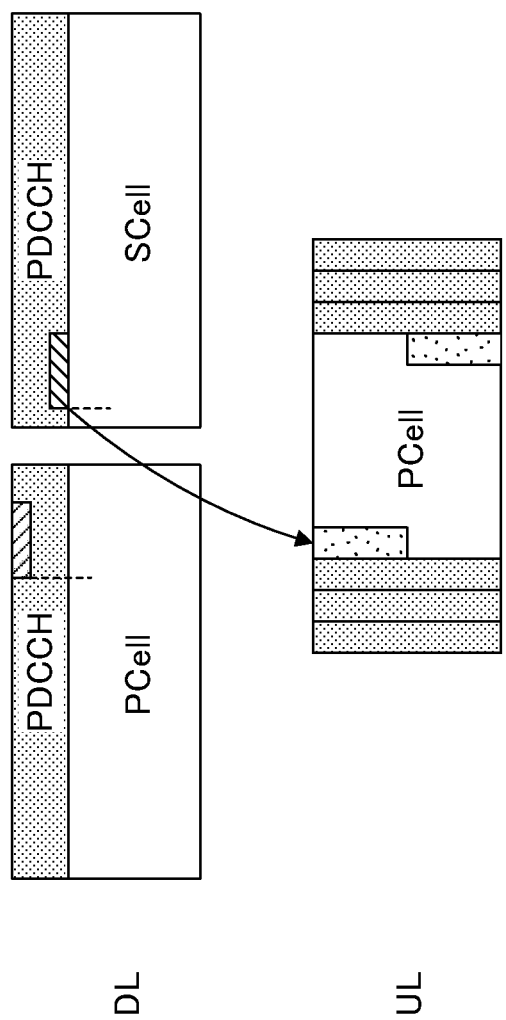
FIG. 14 is a diagram to show another example of a PUCCH resource determining method.

When PUCCH format 3 is employed, a specific PUCCH resource is determined, from among a plurality of PUCCH resource candidates that are reported through RRC signaling, based on information related to the signal configuration of the PDCCH/EPDCCH of the SCell, without using an ARI (see FIG. 14). The information related to the PDCCH/EPDCCH signal configuration (PDCCH/EPDCCH Config) may include the CCE/ECCE index of the PDCCH/EPDCCH where the SCell's downlink control information (DL DCI) is contained, the aggregation level, the search space, the channel set index, and so on. Assume that the relationship between these pieces of information and the specific PUCCH resource is determined in advance by higher layers. The relationship may be reported by RRC as well.

For example, the user terminal determines a specific PUCCH resource considering whether the CCE/ECCE index of the PDCCH/EPDCCH containing the DL DCI of the SCell is an even number or an odd number, whether it is greater or smaller than a predetermined value, and so on.

Alternatively, the user terminal determines the PUCCH resource considering whether the aggregation level (AL) of the PDCCH/EPDCCH where the DL DCI of the SCell is contained is AL=1, 2, or AL=4, 8. Alternatively, the user terminal determines the PUCCH resource considering whether the search space of the PDCCH/EPDCCH where the DL DCI of the SCell is contained is a common search space (common-SS) or a user-specific search space (UE-SS).

Alternatively, the user terminal determines the PUCCH resource based on the channel set index of the PDCCH/EPDCCH where the DL DCI of the SCell is contained (for example, the PDCCH, EPDCCH set 1 or EPDCCH set 2). The channel set index corresponds to the channel where the user terminal allocates DL DCI. When the EPDCCH is allocated to each user terminal, an EPDCCH set index to include a plurality of EPDCCHs is assigned.

Note that the user terminal can determine the PUCCH resource by combining the CCE/ECCE index, the aggregation level, the search space and the channel set index of the PDCCH/EPDCCH as appropriate.

In this way, the PUCCH resource is determined without using an ARI, so that, even when the user terminal fails to detect the DL DCI of the PCell, it is still possible to prevent the NW (base stations) and the user terminal from making different judgments. Also, the base stations can schedule the resources for PUCCH format 3 dynamically, without using an ARI. Furthermore, if the relationships between the signal configuration of the SCell's PDCCH/EPDCCH and PUCCH resources are reported in advance by RRC, in addition to dynamic scheduling, it becomes possible to allocate PUCCH resources more flexibly, depending on the nature (congestion level) of uplink channel traffic, the interference level in each frequency part in the uplink channel band, and so on.

<Method 2>

According to method 2, the TPC command that is contained in the DL DCI of the SCell is not used as an ARI, and the PDCCH/EPDCCH resource where the DL DCI of the PCell is contained is used as a virtual ARI. Now, method 2 will be described below.

Figure 15:
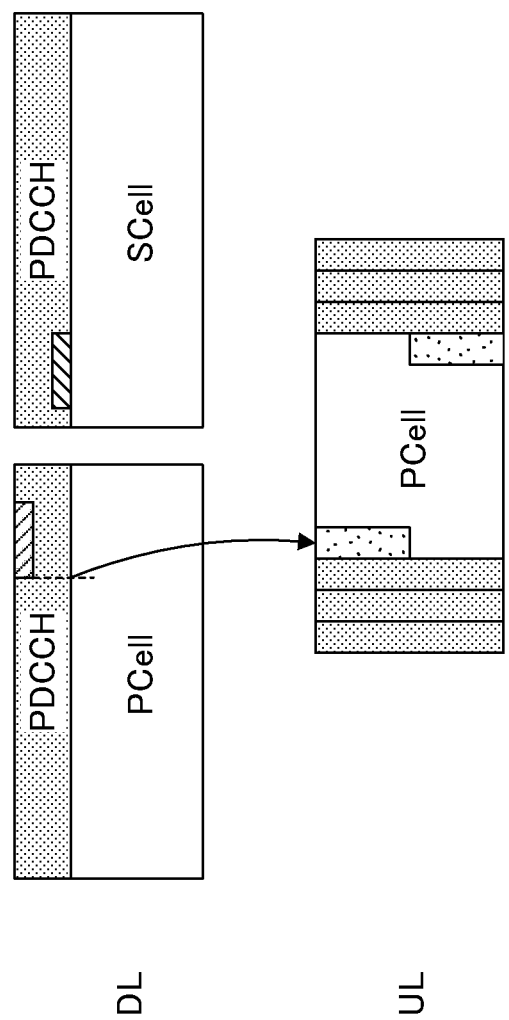
FIG. 15 is a diagram to show another example of a PUCCH resource determining method.

When PUCCH format 1b with channel selection or PUCCH format 3 is employed, a PUCCH resource (or a PUCCH resource candidate) is determined, from among a plurality of PUCCH resource candidates that are reported through RRC signaling, based on information related to the signal configuration of the PCell's PDCCH/EPDCCH (PDCCH/EPDCCH Config), without using an ARI (see FIG. 15).

The information related to the PDCCH/EPDCCH signal configuration (PDCCH/EPDCCH Config) may include the CCE/ECCE index of the PDCCH/EPDCCH where the PCell's downlink control information (DL DCI) is contained, the aggregation level, the search space, the channel set index and so on. Note that the user terminal can determine the PUCCH resource by combining the CCE/ECCE index, the aggregation level, the search space and the channel set index of the PDCCH/EPDCCH as appropriate. Assume that the relationships between these pieces of information and PUCCH resources are determined in advance by higher layers. The relationships may be reported by RRC as well.

By this means, even when the user terminal fails to detect the DL DCI of the PCell, it is still possible to prevent the NW (base stations) and the user terminal from interpreting the TPC command (or the ARI) differently. Furthermore, the base stations become capable of dynamic PUCCH resource scheduling, without using an ARI. If the relationships between the signal configuration of the PCell's PDCCH/EPDCCH and PUCCH resources are reported in advance by way of RRC, in addition to dynamic scheduling, it becomes possible to allocate PUCCH resources more flexibly, depending on the nature (congestion level) of uplink channel traffic, the interference level in each frequency part in the uplink channel band, and so on.

Furthermore, it is equally possible to combine method 1 and method 2, and determine a PUCCH resource by using the PDCCH/EPDCCH resources where DL DCI is contained, and the signal configurations (Config), of both the PCell and the SCell. For example, a method to determine a PUCCH resource depending on whether the CCE/ECCE index of the PDCCH/EPDCCH where the DL DCI of the PCell is contained is greater or smaller than a predetermined value, and determine a specific PUCCH resource depending on whether the CCE/ECCE index of the PDCCH/EPDCCH where the DL DCI of the SCell is contained is an even number or an odd number, may be possible. In other words, this is equivalent to selecting a PUCCH resource set based on the PDCCH/EPDCCH resource where the DL DCI of the PCell is contained and the signal configuration (Config), and selecting one PUCCH resource from the PUCCH resource set based on the PDCCH/EPDCCH resource where the DL DCI of the SCell is contained and the signal configuration (Config). By doing so, it is possible to determine PUCCH resources more freely by using the DL DCI schedulers of both the PCell and the SCell.

<Method 3>

According to method 3, the TPC command that is contained in the DL DCI of the SCell is not used as an ARI, and PUCCH resource candidates are reported to the user terminal in advance. To be more specific, the base stations report the PUCCH resources that are required in PUCCH format 1b with channel selection and PUCCH format 3 to the user terminal through higher layer signaling (for example, RRC signaling).

Figure 16:
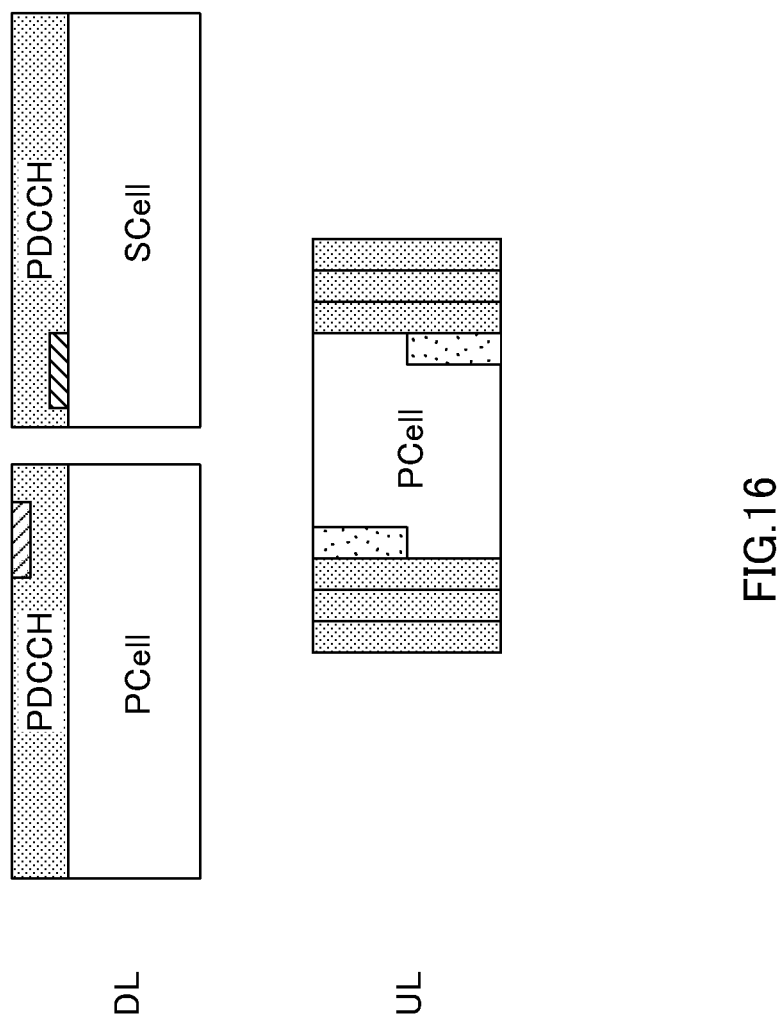
FIG. 16 is a diagram to show another example of a PUCCH resource determining method.

The user terminal uses not only downlink control signals (DCI), but also uses PUCCH resources that are reported from higher layers semi-statically (see FIG. 16). In this case, ARI-based dynamic scheduling is not carried out in PUCCH format 1b with channel selection and in PUCCH format 3. That is, this is equivalent to the case where the value of the ARI is fixed in conventional systems.

In this way, by reporting PUCCH resources semi-statically, ARI-based dynamic scheduling is no longer necessary, so that, even when the user terminal fails to detect the DL DCI of the PCell, it is still possible to prevent the NW (base stations) and the user terminal from interpreting the TPC command (or the ARI) differently.

Note that the above method is structured not to use the ARI. Consequently, when DL assignments (A/N feedback) are present in both the PCell and the SCell, the TPC command that is contained in the DL DCI of the SCell, which has been used heretofore as an ARI, is not used. By contrast, cases might occur where the PUCCHs are transmitted in the PCell and the SCell at different timings, so that it is preferable to apply mutually different CL-TPCs (Closed-Loop TPCs).

For example, regardless of whether or not DL assignments are present in both the PCell and the SCell, the TPC command that is contained in the SCell's DL DCI may be used as a TPC command for the PUCCH in the SCell. When there is a DL assignment (A/N transmission) in the SCell alone, the user terminal carries out PUCCH transmission in the SCell by applying the TPC command contained in the DL DCI of the SCell.

On the other hand, when DL assignments are present in both the PCell and the SCell and PUCCH transmission is carried out in the PCell, although the SCell does not carry out PUCCH transmission, it is possible to appropriate the TPC command that is contained in the SCell's DL DCI in later PUCCH transmission in the SCell. By this means, it is possible to improve the fidelity of TPC commands for the PUCCH of the SCell, without risking increased overhead.

Example 2

According to example 2, while the TPC command contained in the DL DCI of the SCell is used as an ARI, when a user terminal detects only the DL DCI of the SCell, the application of the TPC command is limited. Now, methods 1 to 5 of example 2 will be described below.

<Method 1>

In method 1, a user terminal where the PUCCH of the SCell is configured employs the TPC commands that are contained in the SCell's UL grants. Usually, TPC commands for controlling the PUCCH are contained in DCI DL assignments (DL assignments), and the TPC commands contained in UL grants are used in PUSCH transmission power control. Consequently, according to method 1, the PUSCH and the PUCCH, the transmission power controls of which have heretofore been executed using separate TPC commands, are subjected to transmission power controls using the same TPC commands.

When the user terminal fails to detect the PCell, the TPC command of the DL assignment contained in the DL DCI of the SCell serves as an ARI. Consequently, according to method 1, the CL-TPC for the SCell's PUCCH is executed using TPC commands contained in UL grants. In this case, the SCell can apply CL-TPC to the PUSCH and the PUCCH at the same time.

When the user terminal detects the DL DCI of both the PCell and the SCell, the user terminal determines the PUCCH resource by using the SCell's TPC command as an ARI. On the other hand, when the user terminal detects only the DL DCI of the SCell, the user terminal disregards the TPC command, and determines the PUCCH resource from the SCell's PDCCH/EPDCCH resource, signal configuration and so on. Also, when the user terminal detects a UL grant of the SCell, the user terminal changes the transmission power of the SCell's PUCCH in accordance with the TPC command in the UL grant.

By this means, it is possible to prevent the NW and the user terminal from assuming different powers due to the application of the wrong TPC command by the user terminal. Also, the PUCCH in the SCell is transmitted in the direction of the RRH (Remote Radio Head), primarily illustrated in FIGS. 1B and 1C. Meanwhile, it is also preferable to transmit the PUSCH towards an RRH where the required transmission power is low. It then follows that the SCell's PUCCH and PUSCH are likely to be transmitted to the same RRH. Consequently, it may be possible to control the transmission power of the SCell's PUCCH and PUSCH with the same TPC command.

<Method 2>

According to method 2, a user terminal where the PUCCH of the SCell is configured applies CL-TPC to the PUCCH of the SCell by using the TPC command contained in the PCell's DCI format 3/3A.

DCI format 3/3A is a control information format for TPC commands configured in the common search space. Usually, when the user terminal detects a UL grant or a DL assignment, the user terminal carries out transmission power control using the TPC command contained in the UL grant or the DL assignment. Meanwhile, even if the user terminal detects a UL grant or a DL assignment and a DCI format 3/3A in the same subframe, the user terminal disregards the TPC command contained in the DCI format 3/3A. Consequently, given that UL grants and DL assignments are transmitted continuously to a user terminal that communicates a large volume of data, the TPC command in DCI format 3/3A is oftentimes not applied. So, according to method 2, when only the DL DCI of the SCell is detected, DCI format 3/3A is applied preferentially.

When the user terminal fails to detect the PCell, the TPC command of the DL assignment contained in the DL DCI of the SCell serves as an ARI. So, a user terminal where the PUCCH of the SCell is configured employs the TPC command contained in the PCell's DCI format 3/3A preferentially, and applies CL-TPC to the SCell's PUCCH. Consequently, the base stations have only to configure the use of DCI format 3/3A and the priorities of TPC commands in the user terminal by higher layers such as RRC, and transmit TPC commands which the base stations want to apply to the SCell's PUCCH in DCI format 3/3A. In this case, despite the fact that the TPC command contained in the DL DCI of the SCell is used as an ARI, the user terminal can receive DCI format 3/3A and carry out transmission power control adequately.

When the user terminal detects the DL DCI of both the PCell and the SCell, the user terminal determines the PUCCH resource by using the SCell's TPC command as an ARI. On the other hand, when the user terminal detects only the DL DCI of the SCell, the user terminal disregards the TPC command, and determines the PUCCH resource from the SCell's PDCCH/EPDCCH resource, signal configuration and so on. Also, when the user terminal detects the PCell's DCI format 3/3A, the user terminal changes the transmission of the SCell's PUCCH in accordance with this TPC command.

By this means, it is possible to prevent the NW and the user terminal from assuming different powers due to the application of the wrong TPC command by the user terminal. While the TPC command of the DL assignment that is contained in the DL DCI of the SCell is used as an ARI as has been heretofore, TPC commands are transmitted by means of DCI format 3/3A, so that it becomes possible to carry out the transmission power control for the PUCCH of the SCell adequately.

<Method 3>

According to method 3, a user terminal where the PUCCH of the SCell is configured provides a period (subframe) in which the TPC command bits contained in the SCell's UL grant are not used in CL-TPC.

For example, assume a case where the TDD cell serves as the PCell, the FDD cell serves as the SCell and the DL DCI of the SCell alone is detected. In this case, in the subframe a predetermined period before (for example, 4 ms before) a subframe in which the TDD cell and the FDD cell are directed to UL at the same time, the user terminal does not use the TPC command contained in the DL DCI of the SCell (FDD cell) in CL-TPC. In the other subframes, the user terminal uses this TPC command in CL-TPC for the PUCCH of the SCell (see FIG. 17).

Also, when the TDD cell serves as the PCell, the FDD cell serves as the SCell and the DL DCIs of both the PCell and the SCell are detected, the TPC command contained in the SCell's DL DCI of is used as an ARI.

In this way, by limiting the use of TPC commands in a selective manner in subframes where there is a possibility of a detection failure by the user terminal (when only the Scell carries out A/N transmission), it is possible to minimize the limitation of TPC commands. Also, it is possible to prevent the NW and the user terminal from assuming different powers due to the application of the wrong TPC command by the user terminal.

<Method 4>

According to method 4, a user terminal where the PUCCH of the SCell is configured divides the TPC command contained in the DCI of the SCell into a TPC command field and an ARI field. For example, if the TPC command is two bits, the user terminal divides this into a one-bit TPC command field and a one-bit ARI field, and carries out power control and determines the PUCCH resource based on the bit of each field.

In this case, assume that two PUCCH resources can be specified with the ARI (the ARI of conventional systems can specify four (two bits)). Also, assume that two values are specified by the TPC command (for example, +1 dB and −1 dB, etc.) (conventional TPC commands can specify four (two bits)).

When the user terminal detects the DCIs of both the PCell and the SCell, the user terminal determines the PUCCH resource by using the one-bit ARI. Also, when the user terminal detects only the SCell's DCI, the user terminal uses the one-bit TPC command and disregards the one-bit ARI. As for the PUCCH resource in this case, the PUCCH resource that is determined from the PDCCH/EPDCCH resource where the SCell's DCI is contained is used.

By this means, it is possible to prevent the NW and the user terminal from assuming different powers due to the application of the wrong TPC command by the user terminal. Also, since existing TPC bits are used, it is possible to reduce the increase of overhead. Also, since the PUCCH resources that can be specified by the ARI can be configured on a per user terminal basis, if there are two candidates, it is possible to specify PUCCH resources on a sufficiently dynamic level.

<Method 5>

According to method 5, the PUCCH transmission of the SCell is controlled in a selective manner by using specific downlink control information (EPDCCH). To be more specific, the PUCCH transmission of the SCell is allowed only when DL DCI is transmitted in the EPDCCH of the SCell, and the ARO field that is contained in the EPDCCH is used as a TPC command field.

The ARO was introduced in Rel. 11, and specifies the offset value to add to the ECCE index when determining the PUCCH resource to use in the ACK/NACK feedback for the PDSCH that is modulated using the EPDCCH. Note that a two-bit ARO is provided in the EPDCCH.

Also, the ARO that was introduced in Rel. 11 does not take into account the application of CA (Non-CA), and therefore is not used (zero-fixed) when CA is employed. So, with method 5, power control is executed by using the ARO when CA is employed, so that it is possible to make the TPC and the ARI each function as two bits.

By this means, it is possible to prevent the NW and the user terminal from assuming different powers due to the application of the wrong TPC command by the user terminal. Also, since unused bits are used, it is possible to reduce the increase of overhead.

Note that the field to use as TPC commands is not limited to the ARO field, and, besides this, the unused bits that are contained in DCI may be used as well. Also, it is equally possible to use TPC commands for power control and use the ARO field as an ARI.

<Others>

The mechanism to read the two-bit field in the DL DCI of the SCell as a TPC command and an ARI may be changed. For example, it is possible to add two bits to the DL DCI of the SCell as a new ARI field, and make a structure in which the TPC command and the ARI field are separate. In particular, the number of connecting user terminals in the SCell is likely to be low in comparison to the PCell, so that it is preferable to provide this in the SCell's DL DCI.

(Variation)

Note that, although cases have been described above with embodiments 1 and 2 where the feedback timing for when CA is not employed is used as the HARQ timing in response to the allocation of the DL signal (PDSCH signal) of each of the FDD cell and the TDD cell, the present embodiment is by no means limited to this. For example, it is equally possible to make the DL HARQ timing in the TDD cell the same as the DL HARQ timing in FDD, in intra-eNB CA (see FIG. 23). In this case, the A/N in response to the PDSCH signal that is transmitted in a DL subframe of the TDD cell can be fed back in the UL subframe of the FDD cell that comes a predetermined period (for example, 4 ms) after the subframe in which the PDSCH signal is transmitted. By this means, it is possible to reduce the feedback delay in TDD DL HARQ to 4 ms. Also, since it is possible to reduce the number of delivery acknowledgement signals to feed back in one UL subframe and distribute these signals over a plurality of subframes, even when a base station fails to detect a delivery acknowledgement signal, it is possible to reduce the impact this has on DL HARQ.

Figure 23:
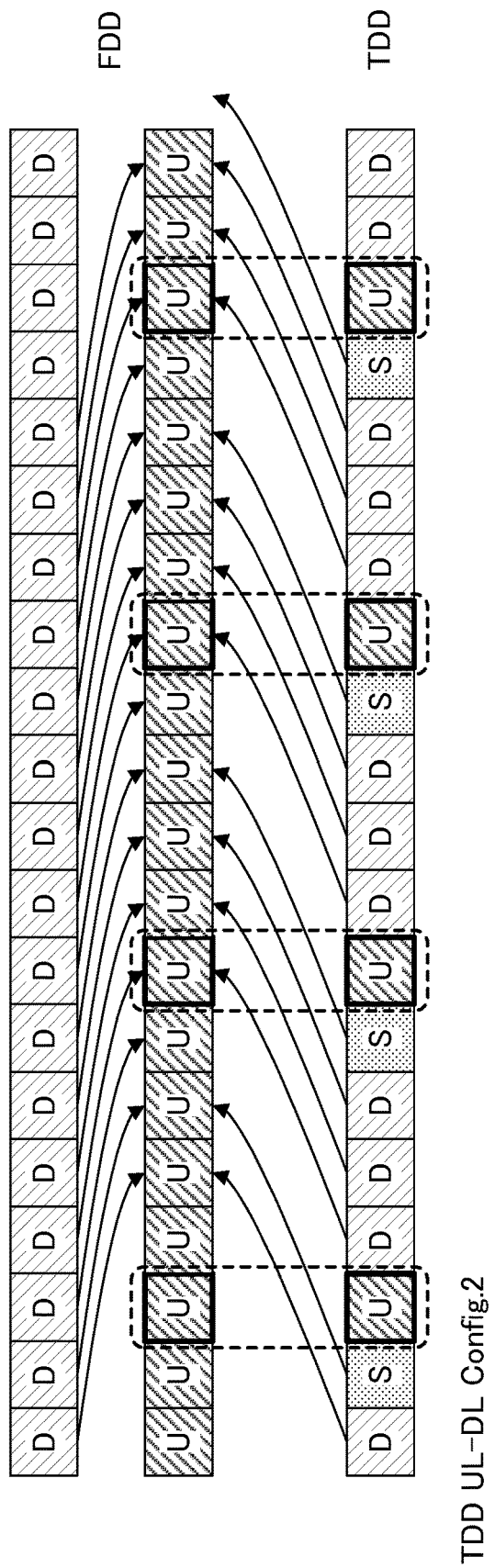
FIG. 23 is a diagram to explain another example of DL HARQ timing that is applicable to the present embodiment in TDD-FDD CA.

Meanwhile, in the case illustrated in FIG. 23, in timings (TDD cell's UL subframes) where both the FDD cell and the TDD cell are directed to UL, in which CC the A/N's should be multiplexed and PUCCH transmission should be carried out is the problem. In this case, it is possible to select the cell to carry out PUCCH transmission by using one of the examples shown with the above embodiments. For example, referring to FIG. 23, cases might occur in a subframe in which both the FDD cell and the TDD cell are directed to UL, including the case where PUCCH transmission is carried out only in one cell (the FDD cell or the TDD cell) regardless of the configuration of the primary cell, the case where PUCCH transmission is carried out in the PCell or in the SCell, or the case where PUCCH transmission is carried out in the cell that carries out A/N transmission in this subframe.

(Structure of Radio Communication System)

Now, an example of a radio communication system according to the present embodiment will be described in detail below.

Figure 18:
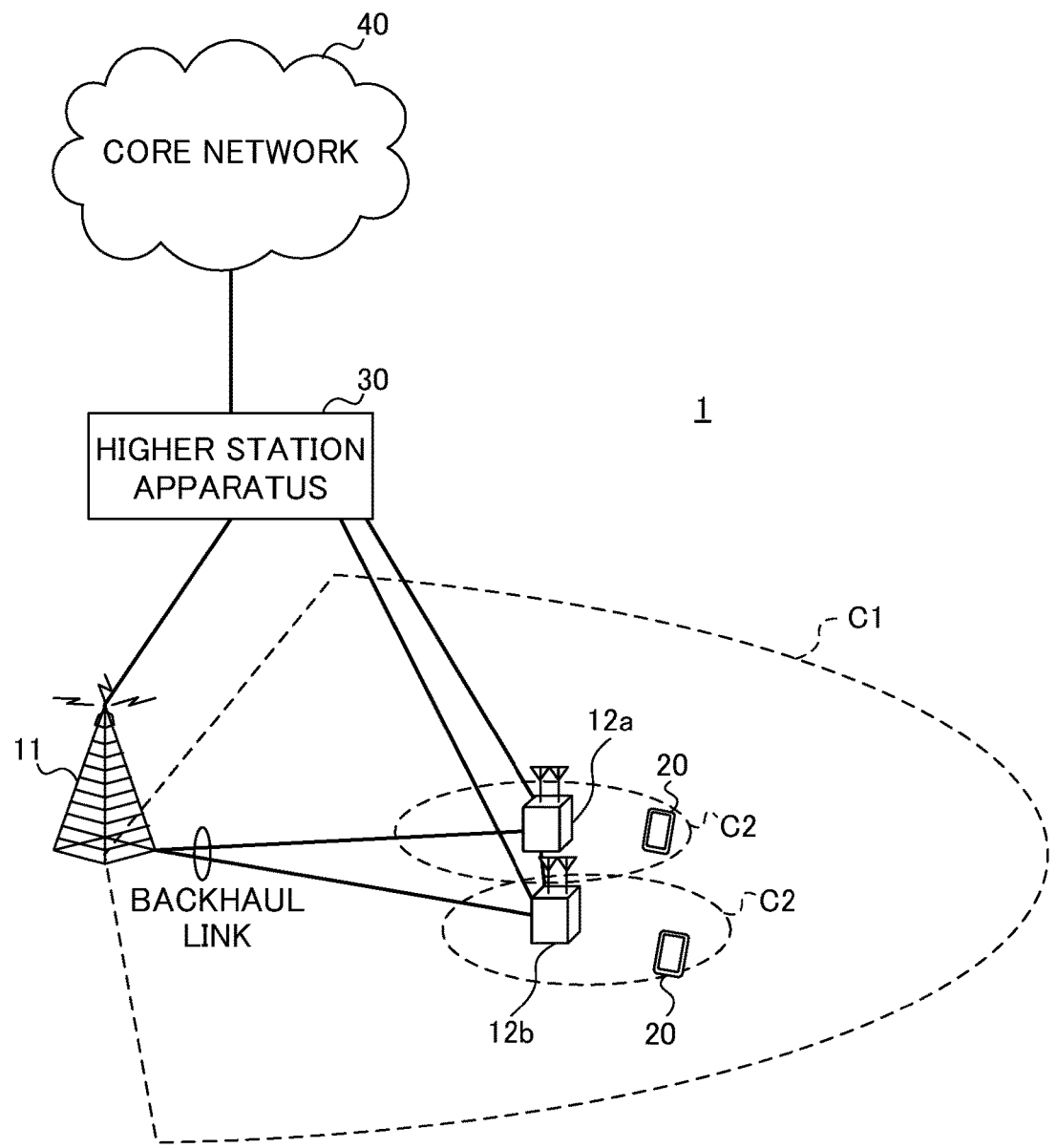
FIG. 18 is a schematic diagram to show an example of a radio communication system according to the present embodiment.

FIG. 18 is a schematic structure diagram of the radio communication system according to the present embodiment. Note that the radio communication system shown in FIG. 18 is a system to incorporate, for example, the LTE system or SUPER 3G. This radio communication system can adopt carrier aggregation (CA) to group a plurality of fundamental frequency blocks (component carriers) into one, where the system bandwidth of the LTE system constitutes one unit. Also, this radio communication system may be referred to as "IMT-advanced," or may be referred to as "4G," "FRA (Future Radio Access)," etc.

The radio communication system 1 shown in FIG. 18 includes a radio base station 11 that forms a macro cell C1, and radio base stations 12a and 12b that form small cells C2, which are placed inside the macro cell C1 and which are narrower than the macro cell C1. Also, user terminals 20 are placed in the macro cell C1 and in each small cell C2. The user terminals 20 can connect with both the radio base station 11 and the radio base stations 12 (dual connectivity). Also, intra-base station CA (intra-eNB CA) or inter-base station CA (inter-eNB CA) is applied between the radio base station 11 and the radio base station 12. Furthermore, it is possible that one of the radio base station 11 and the radio base station 12 employs FDD and the other one employs TDD.

Between the user terminals 20 and the radio base station 11, communication is carried out using a carrier of a relatively low frequency band (for example, 2 GHz) and a narrow bandwidth (referred to as, for example, "existing carrier," "legacy carrier" and so on). Meanwhile, between the user terminals 20 and the radio base stations 12, a carrier of a relatively high frequency band (for example, 3.5 GHz and so on) and a wide bandwidth may be used, or the same carrier as that used in the radio base station 11 may be used. A new carrier type (NCT) may be used as the carrier type between the user terminals 20 and the radio base stations 12. Between the radio base station 11 and the radio base stations 12 (or between the radio base stations 12), wire connection (optical fiber, X2 interface and so on) or wireless connection is established.

The radio base station 11 and the radio base stations 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with the higher station apparatus via the radio base station 11.

Note that the radio base station 11 is a radio base station having a relatively wide coverage, and may be referred to as an "eNodeB," a "macro base station," a "transmitting/receiving point" and so on. Also, the radio base stations 12 are radio base stations having local coverages, and may be referred to as "small base stations," "pico base stations," "femto base stations," "Home eNodeBs," "micro base stations," "transmitting/receiving points" and so on. Hereinafter the radio base stations 11 and 12 will be collectively referred to as "radio base station 10," unless specified otherwise. The user terminals 20 are terminals to support various communication schemes such as LTE, LTE-A and so on, and may be both mobile communication terminals and stationary communication terminals.

In this radio communication system, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single-carrier transmission scheme to mitigate interference between terminals by dividing the system band into bands formed with one or continuous resource blocks per terminal, and allowing a plurality of terminals to use mutually different bands.

Now, communication channels used in the radio communication system shown in FIG. 18 will be described. Downlink communication channels include a PDSCH (Physical Downlink Shared CHannel), which is used by each user terminal 20 on a shared basis, and downlink L1/L2 control channels (PDCCH, PCFICH, PHICH and enhanced PDCCH). User data and higher control information are transmitted by the PDSCH. Scheduling information for the PDSCH and the PUSCH and so on are transmitted by the PDCCH (Physical Downlink Control CHannel). The number of OFDM symbols to use in the PDCCH is transmitted by the PCFICH (Physical Control Format Indicator Channel). HARQ ACKs/NACKs for the PUSCH are transmitted by the PHICH (Physical Hybrid-ARQ Indicator CHannel). Also, the scheduling information for the PDSCH and the PUSCH and so on may be transmitted by the enhanced PDCCH (EPDCCH) as well. This EPDCCH is frequency-division-multiplexed with the PDSCH (downlink shared data channel).

Uplink control channels include a PUSCH (Physical Uplink Shared CHannel), which is used by each user terminal 20 on a shared basis as an uplink data channel, and a PUCCH (Physical Uplink Control CHannel), which is an uplink control channel. User data and higher control information are transmitted by this PUSCH. Also, by means of the PUCCH, downlink radio quality information (CQI: Channel Quality Indicator), ACK/NACK and so on are transmitted.

Figure 19:
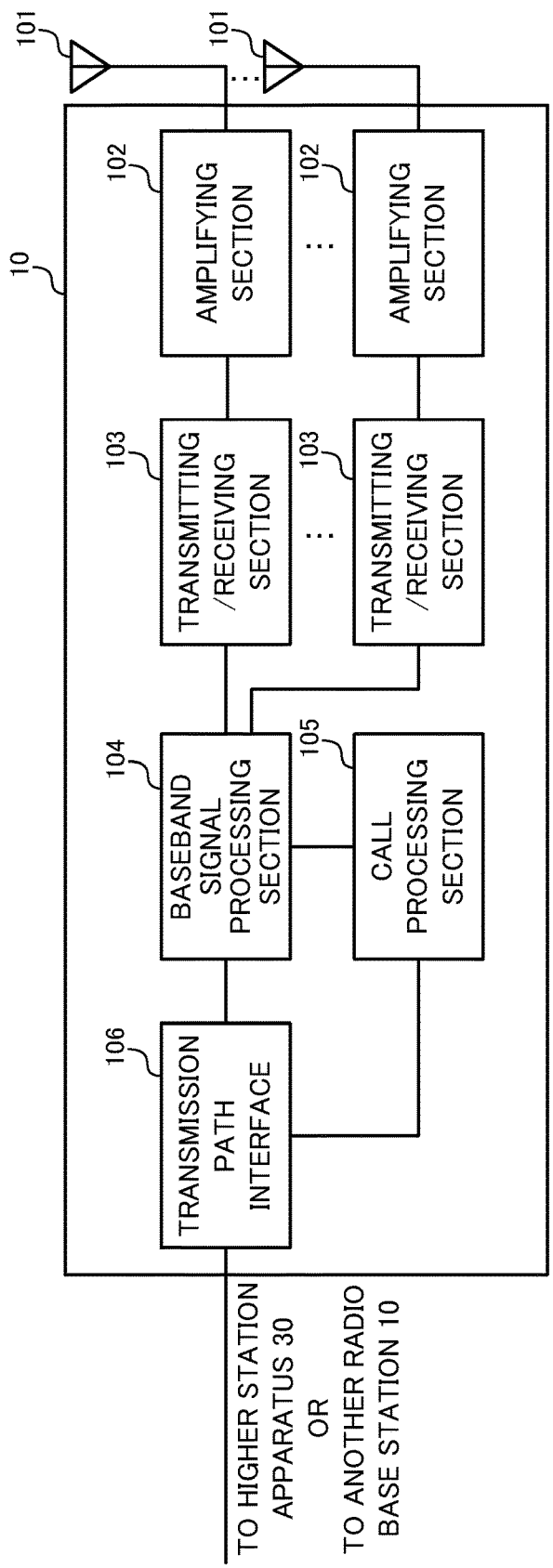
FIG. 19 is a diagram to explain an overall structure of a radio base station according to the present embodiment.

FIG. 19 is a diagram to show an overall structure of a radio base station 10 (which may be either a radio base station 11 or 12) according to the present embodiment. The radio base station 10 has a plurality of transmitting/receiving antennas 101 for MIMO transmission, amplifying sections 102, transmitting/receiving sections 103, a baseband signal processing section 104, a call processing section 105 and a transmission path interface 106.

User data to be transmitted from the radio base station 10 to the user terminals 20 on the downlink is input from the higher station apparatus 30, into the baseband signal processing section 104, via the transmission path interface 106.

In the baseband signal processing section 104, a PDCP layer process, division and coupling of user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process and a precoding process are performed, and the result is transferred to each transmitting/receiving section 103. Furthermore, downlink control channel signals are also subjected to transmission processes such as channel coding and an inverse fast Fourier transform, and are transferred to each transmitting/receiving section 103.

Also, the baseband signal processing section 104 reports, to the user terminals 20, control information for allowing communication in the cell, through higher layer signaling (RRC signaling, broadcast signal and so on). The information for allowing communication in the cell includes, for example, the uplink or downlink system bandwidth, feedback resource information and so on. Each transmitting/receiving section 103 converts baseband signals that are pre-coded and output from the baseband signal processing section 104 on a per antenna basis, into a radio frequency band. The amplifying sections 102 amplify the radio frequency signals having been subjected to frequency conversion, and transmit the signals through the transmitting/receiving antennas 101.

On the other hand, as for data to be transmitted from the user terminals 20 to the radio base station 10 on the uplink, radio frequency signals that are received in the transmitting/receiving antennas 101 are each amplified in the amplifying sections 102, converted into baseband signals through frequency conversion in each transmitting/receiving section 103, and input in the baseband signal processing section 104.

In the baseband signal processing section 104, the user data that is included in the input baseband signals is subjected to an FFT process, an IDFT process, error correction decoding, a MAC retransmission control receiving process, and RLC layer and PDCP layer receiving processes, and the result is transferred to the higher station apparatus 30 via the transmission path interface 106. The call processing section 105 performs call processing such as setting up and releasing communication channels, manages the state of the radio base stations 10 and manages the radio resources.

Figure 20:
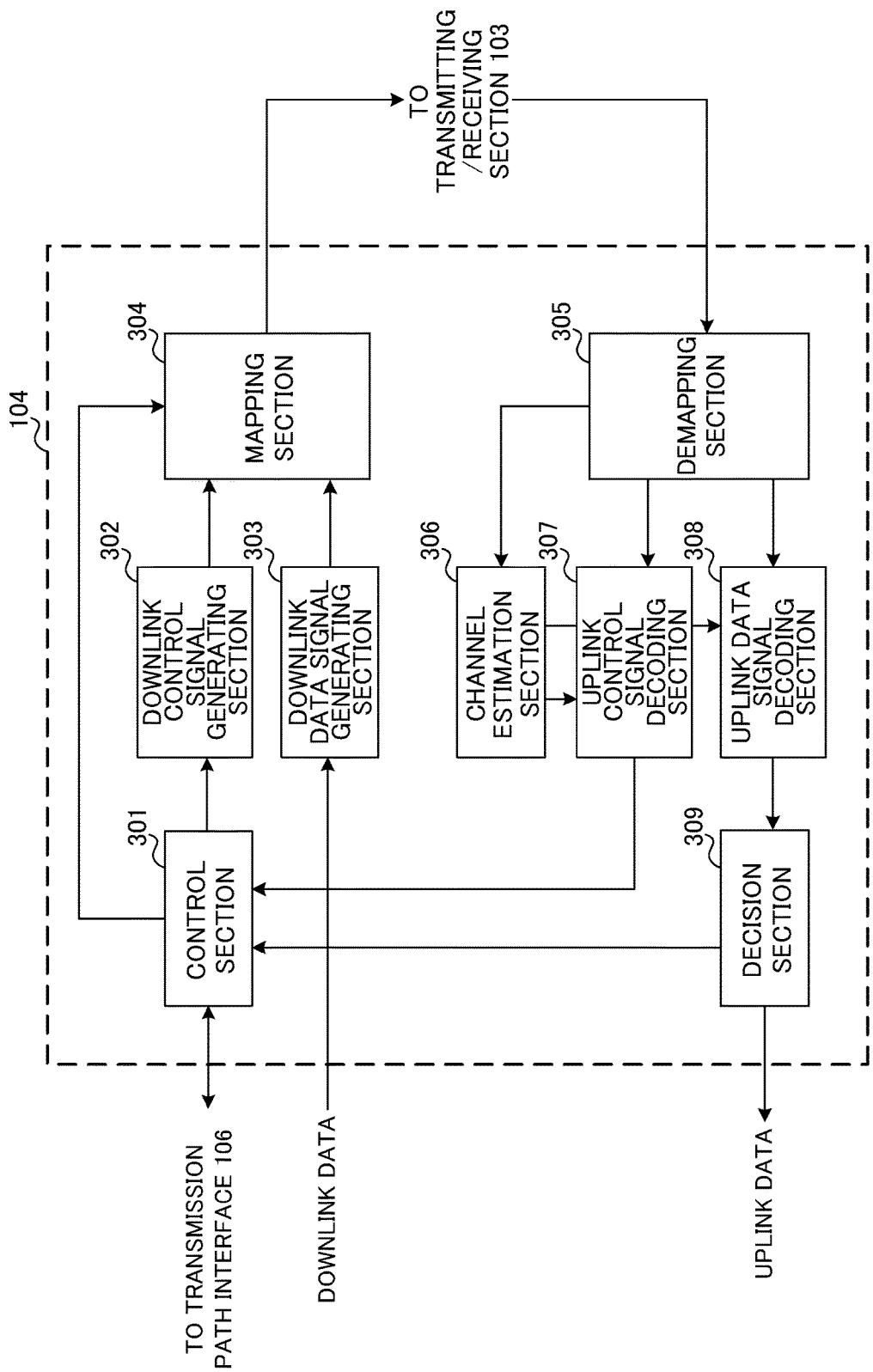
FIG. 20 is a diagram to explain a functional structure of a radio base station according to the present embodiment.

FIG. 20 is a diagram to show a principle functional structure of the baseband signal processing section 104 provided in the radio base station 10 according to the present embodiment. As shown in FIG. 20, the baseband signal processing section 104 provided in the radio base station 10 is comprised at least of a control section 301, a downlink control signal generating section 302, a downlink data signal generating section 303, a mapping section 304, a demapping section 305, a channel estimation section 306, an uplink control signal decoding section 307, an uplink data signal decoding section 308 and a decision section 309.

The control section 301 controls the scheduling of downlink user data that is transmitted in the PDSCH, downlink control information that is transmitted in the PDCCH and/or the enhanced PDCCH (EPDCCH), downlink reference signals and so on. Also, the control section 301 controls the scheduling of uplink data that is transmitted in the PUSCH, uplink control information that is transmitted in the PUCCH or the PUSCH, and uplink reference signals (allocation control). Information about the allocation control of uplink signals (uplink control signals and uplink user data) is reported to user terminals by using a downlink control signal (DCI).

To be more specific, the control section 301 controls the allocation of radio resources with respect to downlink signals and uplink signals, based on command information from the higher station apparatus 30, feedback information from each user terminal 20 and so on. That is, the control section 301 functions as a scheduler. Also, in inter-eNB CA, the control section 301 is provided for each of multiple CCs separately, and, in intra-eNB CA, the control section 301 is provided to be shared by multiple CCs.

Also, in accordance with above example 1 of embodiment 1, when the PUCCH resources in the user terminals are determined depending on the resource and signal configuration of the PDCCH/EPDCCH and so on, the control section 301 controls and reports the signal configuration of the PDCCH/EPDCCH to the downlink control signal generating section 302.

The downlink control signal generating section 302 generates downlink control signals (PDCCH signal and/or EPDCCH signal) determined to be allocated by the control section 301. To be more specific, based on commands from the control section 301, the downlink control signal generating section 302 generates a DL assignment to report downlink signal allocation information, and a UL grant to report uplink signal allocation information.

For example, following above embodiment 1, the downlink control signal generating section 302 configures an ARI to specify a PUCCH resource (PUCCH resource candidate), by using a TPC command of downlink control information. Also, in accordance with above example 1 of embodiment 2, the downlink control signal generating section 302 provides no ARI in downlink control information. In accordance with above example 2 of embodiment 2, the downlink control signal generating section 302 configures TPC commands and ARIs in downlink control information as appropriate.

The downlink data signal generating section 303 generates downlink data signals (PDSCH signal). The data signals that are generated in the data signal generating section 303 are subjected to a coding process and a modulation process, based on coding rates and modulation schemes that are determined based on CSI from each user terminal 20 and so on.

Based on commands from the control section 301, the mapping section 304 controls the allocation of the downlink control signals generated in the downlink control signal generating section 302 and the downlink data signals generated in the downlink data signal generating section 303, to radio resources.

The demapping section 305 demaps the uplink signals transmitted from the user terminals and separates the uplink signals. The channel estimation section 306 estimates the channel states from the reference signals included in the received signals separated in the demapping section 305, and outputs the estimated channel states to the uplink control signal decoding section 307 and the uplink data signal decoding section 308.

The uplink control signal decoding section 307 decodes the feedback signals (delivery acknowledgement signals, etc.) transmitted from the user terminals through an uplink control channel (PUCCH), and outputs the results to the control section 301. The uplink data signal decoding section 308 decodes the uplink data signals transmitted from the user terminals through an uplink shared channel (PUSCH), and outputs the results to the decision section 309. The decision section 309 makes retransmission control decisions (ACK/NACK) based on the decoding results in the uplink data signal decoding section 308, and outputs the results to the control section 301.

Figure 21:
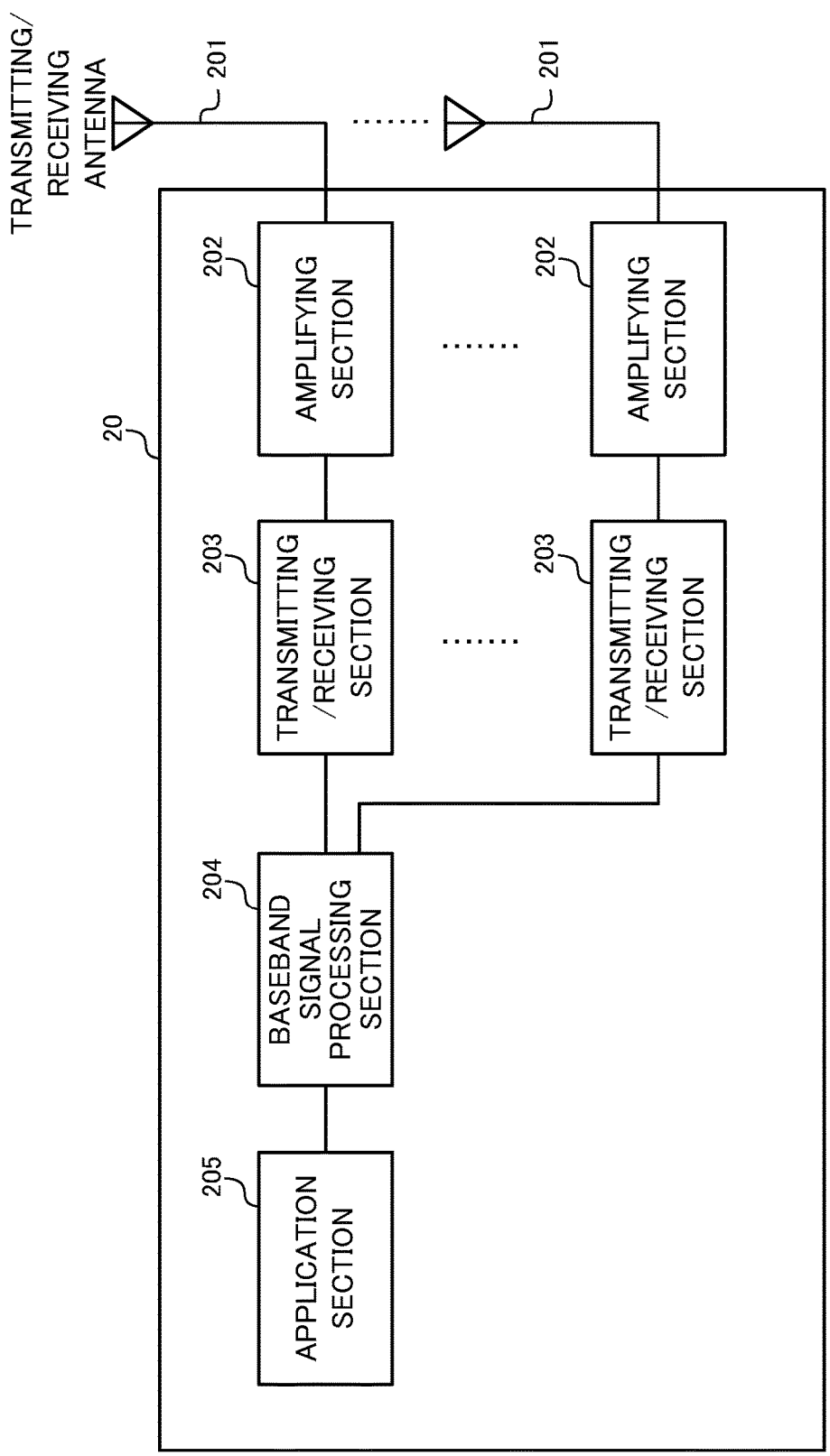
FIG. 21 is a diagram to explain an overall structure of a user terminal according to the present embodiment.

FIG. 21 is a diagram to show an overall structure of a user terminal 20 according to the present embodiment. A user terminal 20 has a plurality of transmitting/receiving antennas 201 for MIMO transmission, amplifying sections 202, transmitting/receiving sections (receiving sections) 203, a baseband signal processing section 204 and an application section 205.

As for downlink data, radio frequency signals that are received in the plurality of transmitting/receiving antennas 201 are each amplified in the amplifying sections 202, and subjected to frequency conversion and converted into the baseband signal in the transmitting/receiving sections 203. This baseband signal is subjected to receiving processes such as an FFT process, error correction decoding and retransmission control, in the baseband signal processing section 204. In this downlink data, downlink user data is transferred to the application section 205. The application section 205 performs processes related to higher layers above the physical layer and the MAC layer. Also, in the downlink data, broadcast information is also transferred to the application section 205.

Meanwhile, uplink user data is input from the application section 205 to the baseband signal processing section 204. In the baseband signal processing section 204, a retransmission control (H-ARQ (Hybrid ARQ)) transmission process, channel coding, precoding, a DFT process, an IFFT process and so on are performed, and the result is transferred to each transmitting/receiving section 203. The baseband signal that is output from the baseband signal processing section 204 is converted into a radio frequency band in the transmitting/receiving sections 203. After that, the amplifying sections 202 amplify the radio frequency signals having been subjected to frequency conversion, and transmit the resulting signals from the transmitting/receiving antennas 201.

Figure 22:
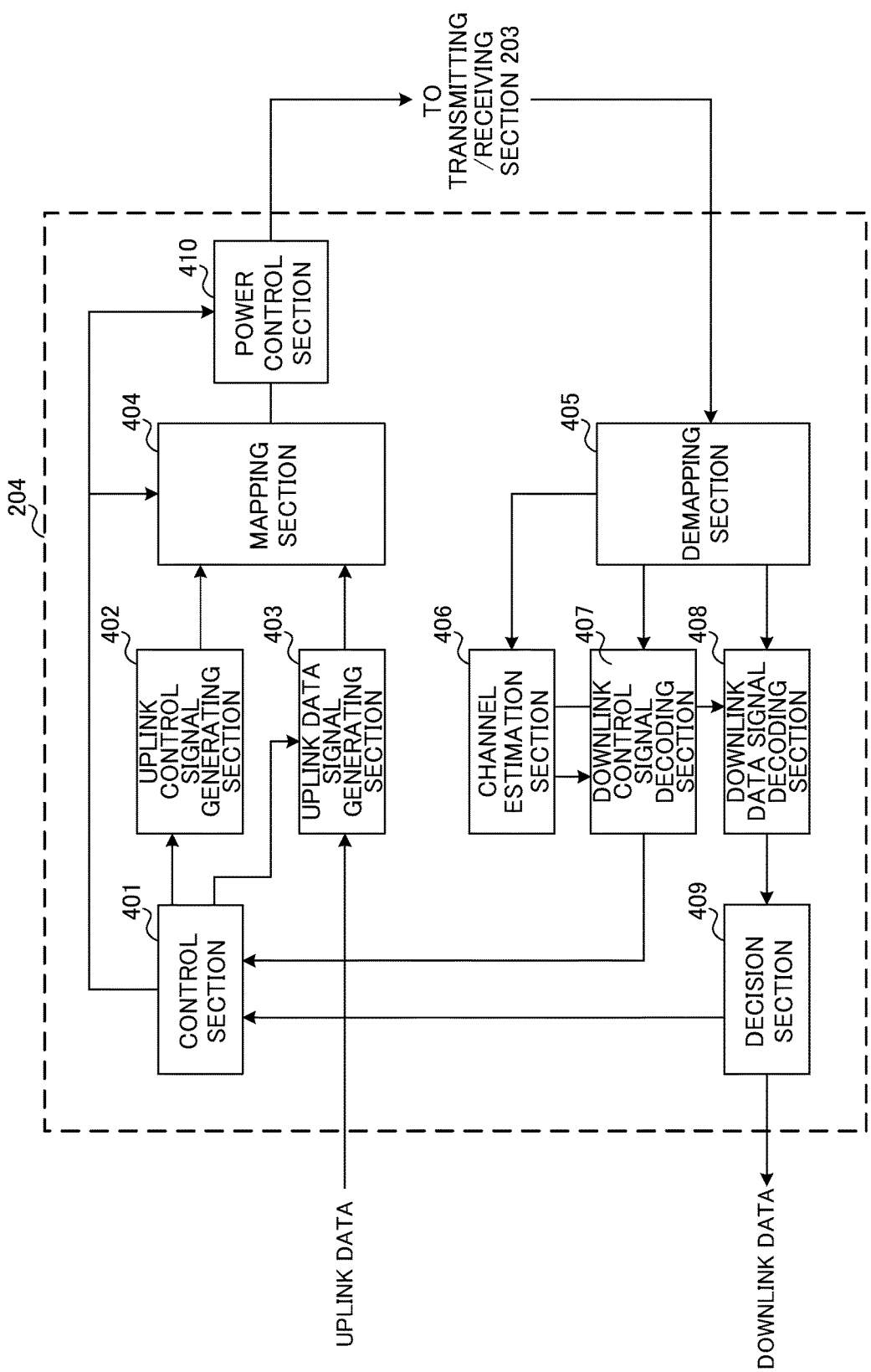
FIG. 22 is a diagram to explain a functional structure of a user terminal according to the present embodiment.

FIG. 22 is a diagram to show a principle functional structure of the baseband signal processing section 204 provided in the user terminal 20. As shown in FIG. 22, the baseband signal processing section 204 provided in the user terminal 20 is comprised at least of a control section 401 (feedback control section), an uplink control signal generating section 402, an uplink data signal generating section 403, a mapping section 404, a demapping section 405, a channel estimation section 406, a downlink control signal decoding section 407, a downlink data signal decoding section 408, a decision section 409 and a power control section 410.

The control section 401 controls the generation of uplink control signals (feedback signals) and uplink data signals based on downlink the control signals (PDCCH signal) transmitted from the radio base stations, retransmission control decisions with respect to the PDSCH signals received, and so on. The downlink control signals are output from the downlink control signal decoding section 408, and the retransmission control decisions are output from the decision section 409.

Also, the control section 401 also functions as a feedback control section that controls the feedback of delivery acknowledgement signals (ACK/NACK) in response to the PDSCH signals. To be more specific, in a mobile communication system in which CA is employed, the control section 401 controls the selection of the cells (or CCs) to feed back delivery acknowledgement signals, the PUCCH resources to allocate delivery acknowledgement signals, and so on. For example, based on downlink control signals transmitted from the radio base stations, the control section 401 determines the cell to feed back delivery acknowledgement signals, the PUCCH resources to use and so on, and indicate these to the mapping section 404.

For example, assume a case where, in TDD-FDD CA (intra-eNB CA), delivery acknowledgement signals are transmitted in response to the DL signals from both cells. In this case, the control section 401 executes control so that PUCCH format 1b with channel selection or PUCCH format 3 is applied and the PUCCH resource of one is used (above-described embodiment 1). Also, the control section 401 can determine the PUCCH resource by using the bit information contained in the secondary cell's downlink control information as an ARI.

Also, the control section 401 can employ PUCCH format 1b with channel selection based on a PUCCH resource candidate that is determined based on the PDCCH resource where the PCell's downlink control information is contained and a PUCCH resource candidate that is determined based on the PDCCH resource where the SCell's downlink control information is contained (above-described method 1 of example 1 of embodiment 2). Also, the control section 401 can select a specific PUCCH resource, from a plurality of PUCCH resource candidates that are configured by higher layer signaling, based on the configuration of the downlink control channel which carries downlink control information for the primary cell or the secondary cell (above-described methods 1 and 2 of example 1 of embodiment 2).

Also, when an ARI is configured, the control section 401 determines the PUCCH resource based on this ARI as appropriate (above-described example 2 of embodiment 2).

The uplink control signal generating section 402 generates uplink control signals (feedback signals such as delivery acknowledgement signals, channel state information (CSI), and so on) based on commands from the control section 401. Also, the uplink data signal generating section 403 generates uplink data signals based on commands from the control section 401. Note that, when a UL grant is included in a downlink control signal reported from the radio base stations, the control section 401 commands the uplink data signal generating section 403 to generate an uplink data signal.

The mapping section 404 (allocation section) controls the allocation of uplink control signals (delivery acknowledgement signals, etc.) and uplink data signal to radio resources (PUCCH and PUSCH) based on commands from the control section 401. For example, depending on the CC (cell) to send feedback (PUCCH transmission), the mapping section 404 allocates the delivery acknowledgement signals to the PUCCH of that CC.

The power control section 410 controls the transmission power of UL signals (PUCCH signal and PUSCH signal) based on commands from the control section 401. For example, the power control section 410 controls CL-TPC based on TPC commands contained in the downlink control signals received in the user terminal 20. Also, when the transmitting/receiving section 203 detects only the SCell's downlink control information, the power control section 410 limits the application of TPC commands contained in downlink control information (above-described example 2 of embodiment 2).

For example, for A/N's that are transmitted by using the SCell's PUCCH resources, the power control section 410 executes power control by using TPC commands contained in UL grants in the SCell's downlink control information (above-described method 1 of example 2 of embodiment 2). Alternatively, for delivery acknowledgement signal that are transmitted by using the SCell's PUCCH resources, the power control section 410 executes power control by using TPC commands contained in the PCell's DCI format 3/3A (above-described method 2 of example 2 of embodiment 2).

The demapping section 405 demaps a downlink signal transmitted from the radio base station 10 and separates the downlink signal. The channel estimation section 406 estimates the channel state from the reference signals included in the received signal separated in the demapping section 405, and outputs the estimated channel state to the downlink control signal decoding section 407 and the downlink data signal decoding section 408.

The downlink control signal decoding section 407 decodes the downlink control signal (PDCCH signal) transmitted in the downlink control channel (PDCCH), and outputs the scheduling information (information regarding the allocation to uplink resources) to the control section 401.

The downlink data signal decoding section 408 decodes the downlink data signal transmitted in the downlink shared channel (PDSCH), and outputs the result to the decision section 409. The decision section 409 makes a retransmission control decision (ACK/NACK) based on the decoding result in the downlink data signal decoding section 408, and also outputs the result to the control section 401.

Now, although the present invention has been described in detail with reference to the above embodiments, it should be obvious to a person skilled in the art that the present invention is by no means limited to the embodiments described herein. The present invention can be implemented with various corrections and in various modifications, without departing from the spirit and scope of the present invention defined by the recitations of the claims. For example, a plurality of examples described above may be combined and implemented as appropriate. Consequently, the description herein is provided only for the purpose of explaining examples, and should by no means be construed to limit the present invention in any way.

The disclosure of Japanese Patent Application No. 2013-199480, filed on Sep. 26, 2013, including the specification, drawings and abstract, is incorporated herein by reference in its entirety.

The invention claimed is:

1. A user terminal that communicates with a primary cell and at least one secondary cell that are supported by different duplex modes, the user terminal comprising:
   a receiver that receives a downlink (DL) signal transmitted from each of the cells;
   a transmitter that transmits a delivery acknowledgement signal for the DL signal by using an uplink control channel of a given secondary cell of the at least one secondary cell; and
   a processor that controls transmission power of the uplink control channel of the given secondary cell,
   wherein the processor applies a transmission power control (TPC) command included in downlink control information of the given secondary cell for power control of the uplink control channel of the given secondary cell, irrespective of whether there is DL allocation in the primary cell and the given secondary cell or not,
   wherein bits from the TPC command are jointly coded with other TPC commands, and
   wherein the transmitter transmits the delivery acknowledgement signal by using an uplink control channel resource which is reported to the user terminal by higher layer signaling.

2. The user terminal according to claim 1, wherein the processor does not apply the TPC command included in the downlink control information of the given secondary cell transmitting the uplink control channel, for resource designation to transmit an uplink control channel in the primary cell.

3. The user terminal according to claim 1, wherein carrier aggregation is performed using the primary cell and the given secondary cell.

4. The user terminal according to claim 2, wherein carrier aggregation is performed using the primary cell and the given secondary cell.

5. A radio base station that communicates with a user terminal using a primary cell and at least one secondary cell that are supported by different duplex, the radio base station comprising:
   a transmitter that transmits a downlink (DL) signal; and
   a receiver that receives a delivery acknowledgement signal transmitted for the DL signal from the user terminal,
   wherein the transmitter transmits downlink control information of a given secondary cell of the at least one secondary cell including a transmission power control (TPC) command, irrespective of whether there is DL allocation in the primary cell and the given secondary cell or not,
   wherein bits from the TPC command are jointly coded with other TPC commands, and wherein the radio base station reports an uplink control channel resource to the user terminal by higher layer signaling, and the receiver receives the delivery acknowledgement signal in the uplink control channel resource.

6. A radio communication method for a user terminal that communicates with a primary cell and at least one secondary cell that are supported by different duplex modes and are formed by a same radio base station, the radio communication method comprising:
   receiving downlink (DL) signals transmitted from each of the cells;
   transmitting a delivery acknowledgement signal for the DL signals by using an uplink control channel of a given secondary cell of the at least one secondary cell; and
   controlling transmission power of the uplink control channel of the given secondary cell, wherein a transmission power control (TPC) command included in downlink control information of the given secondary cell is applied for power control of the uplink control channel of the given secondary cell, irrespective of whether there is DL allocation in the primary cell and the given secondary cell or not,
   wherein bits from the TPC command are jointly coded with other TPC commands, and
   wherein the delivery acknowledgement signal is transmitted by using an uplink control channel resource which is reported to the user terminal by higher layer signaling.

* * * * *